(12) United States Patent
Raetze et al.

(10) Patent No.: US 7,428,940 B2
(45) Date of Patent: Sep. 30, 2008

(54) STEERABLE TRANSPORT TROLLEY

(75) Inventors: Bernd Raetze, Bridgeman Downs (AU);
Douglas Mayes, Bridgeman Downs (AU); Robert J. Ellis, Potts Point (AU);
Norman I. Mathers, Bridgeman Downs (AU)

(73) Assignee: Tynecat Technologies Pty. Ltd (AU)

( * ) Notice: Subject to any disclaimer, the term of this patent is extended or adjusted under 35 U.S.C. 154(b) by 125 days.

(21) Appl. No.: 10/916,752

(22) Filed: Aug. 11, 2004

(65) Prior Publication Data

US 2005/0034908 A1 Feb. 17, 2005

(30) Foreign Application Priority Data

Feb. 12, 2002 (AU) ........................... PS0458
Nov. 1, 2002 (AU) .............................. 2002952422
Feb. 12, 2003 (WO) ..................... PCT/AU03/00173

(51) Int. Cl.
*B62D 1/24* (2006.01)
(52) U.S. Cl. ..................... 180/169; 180/167; 187/237
(58) Field of Classification Search ................. 180/167, 180/169, 908, 6.2; 187/222, 224, 231, 237; 254/2 R See application file for complete search history.

(56) References Cited

U.S. PATENT DOCUMENTS

| | | | | |
|---|---|---|---|---|
| 1,802,010 A | * | 4/1931 | Fitch | 414/348 |
| 2,687,857 A | * | 8/1954 | Caldwell et al. | 244/50 |
| 3,672,470 A | * | 6/1972 | Ohntrup et al. | 187/224 |
| 4,595,331 A | | 6/1986 | Thomson et al. | |
| 4,941,794 A | * | 7/1990 | Hara et al. | 414/341 |
| 5,032,994 A | * | 7/1991 | Wellman | 701/23 |
| 5,374,151 A | * | 12/1994 | Matthews | 414/392 |
| 5,377,106 A | * | 12/1994 | Drunk et al. | 701/25 |
| 5,528,217 A | * | 6/1996 | Adams | 340/435 |
| 5,548,511 A | * | 8/1996 | Bancroft | 701/23 |
| 6,237,504 B1 | * | 5/2001 | Tanahashi et al. | 104/243 |
| 6,241,453 B1 | * | 6/2001 | Upmeyer | 414/667 |

FOREIGN PATENT DOCUMENTS

| | | |
|---|---|---|
| AU | PS 0458 | 2/2002 |
| AU | PS 2002 952 422 | 11/2002 |
| GB | 2123787 | 2/1984 |

* cited by examiner

*Primary Examiner*—Christopher Bottorff
*Assistant Examiner*—Vaughn T. Coolman
(74) *Attorney, Agent, or Firm*—Wells St. John P.S.

(57) ABSTRACT

A transport trolley is disclosed and which includes parallel spaced forks, ground engaging rollers, and a steering system including a distance monitor, a driving system for steering the rollers, and an electronic control system operatively connected to the distance monitors and the drive system.

19 Claims, 18 Drawing Sheets

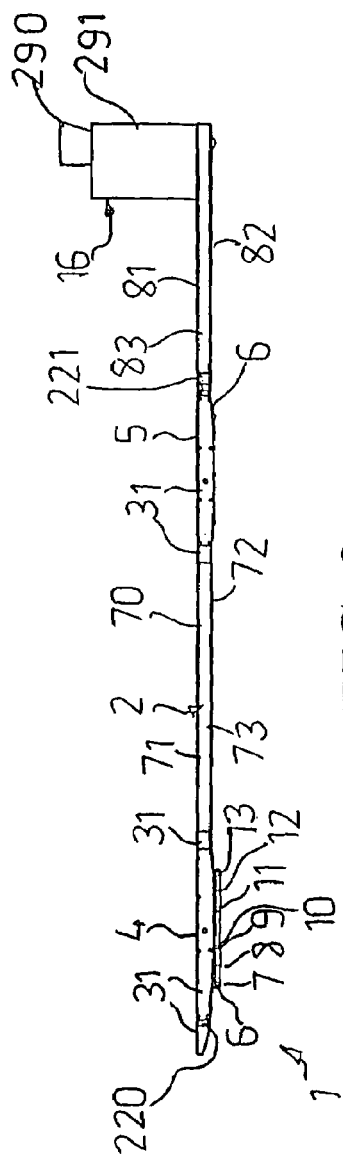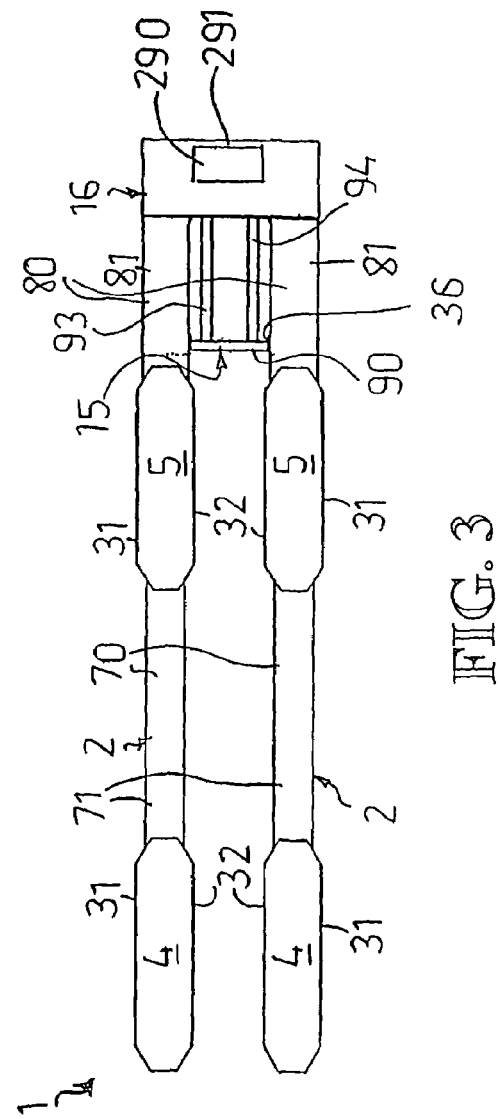

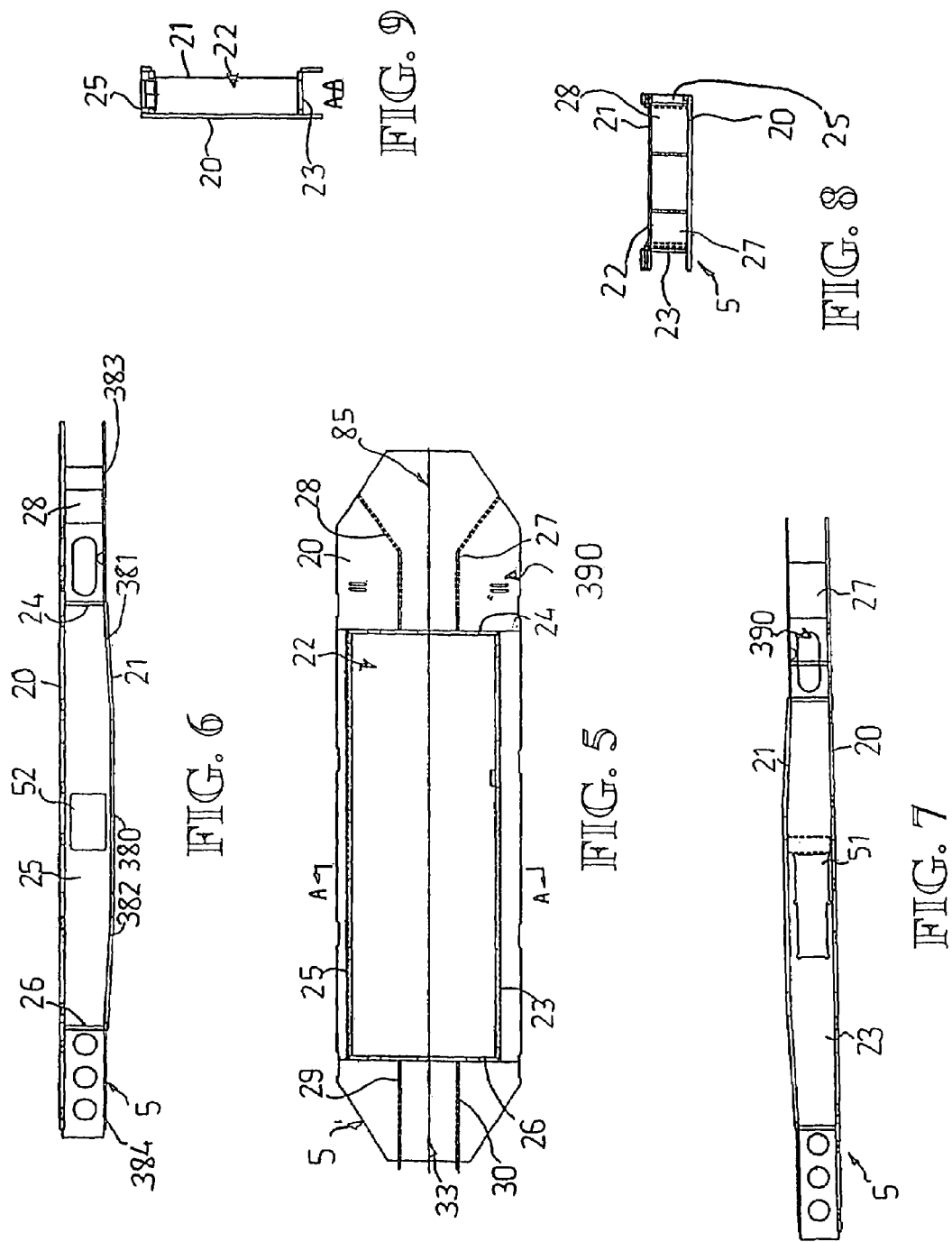

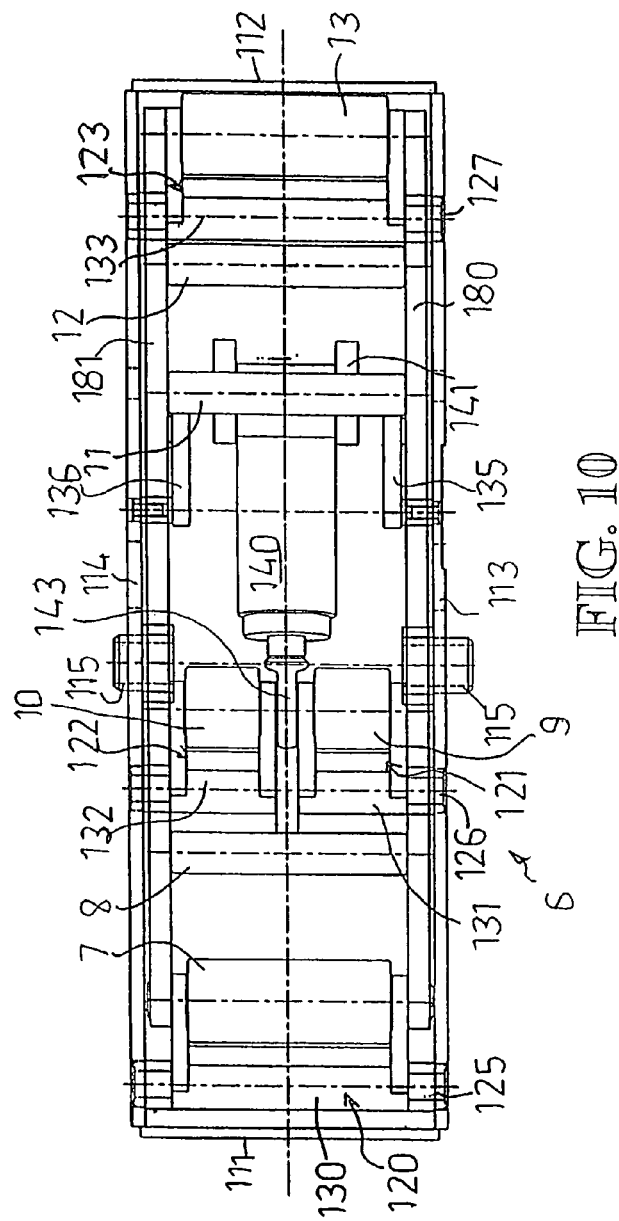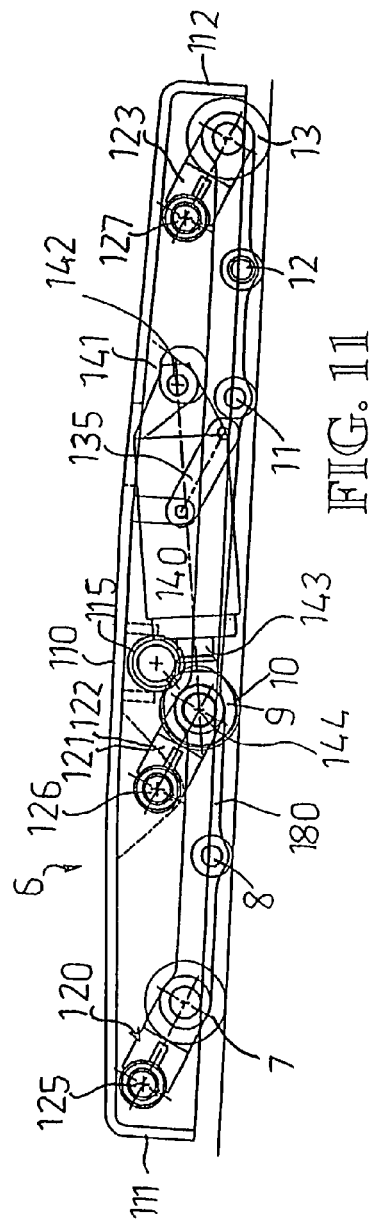
FIG. 10
FIG. 11

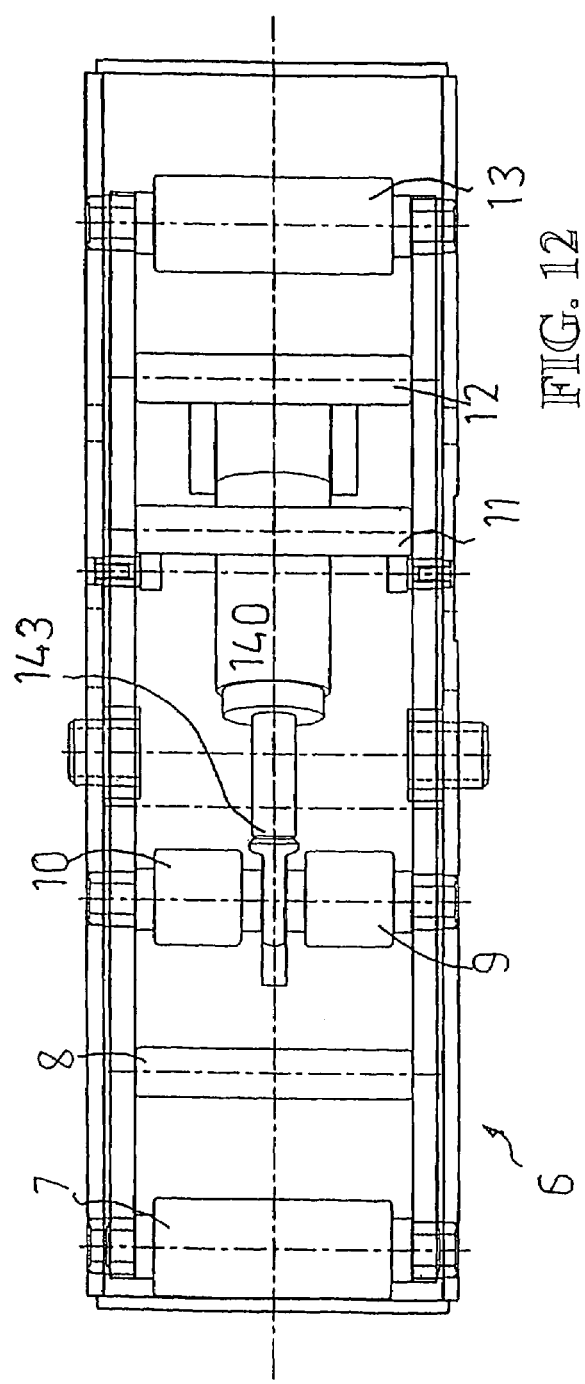
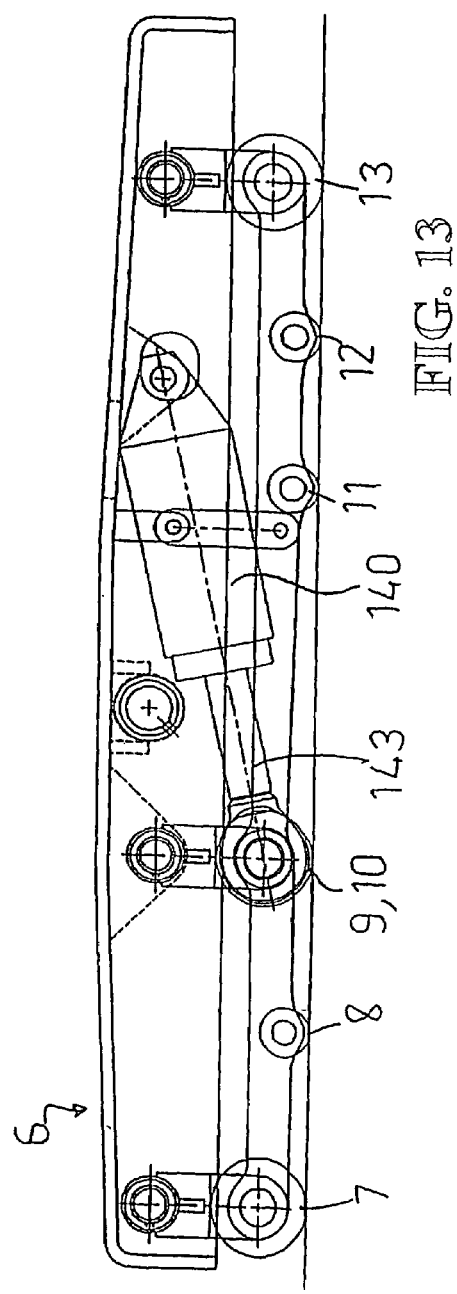
FIG. 12
FIG. 13

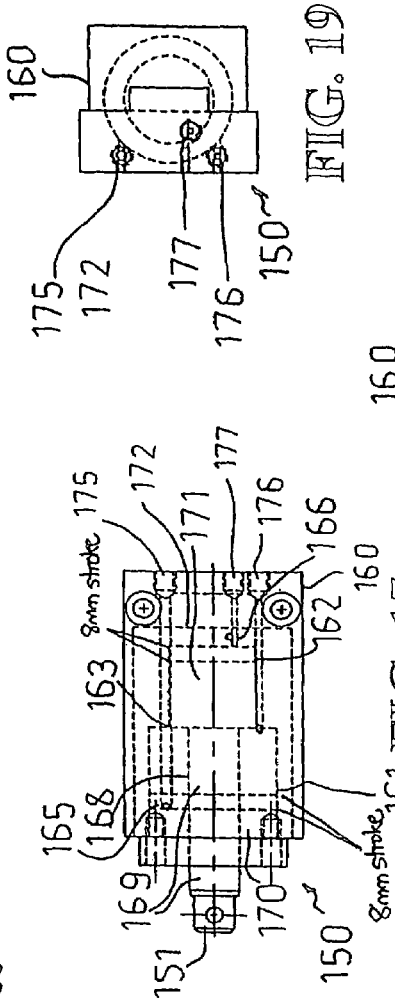

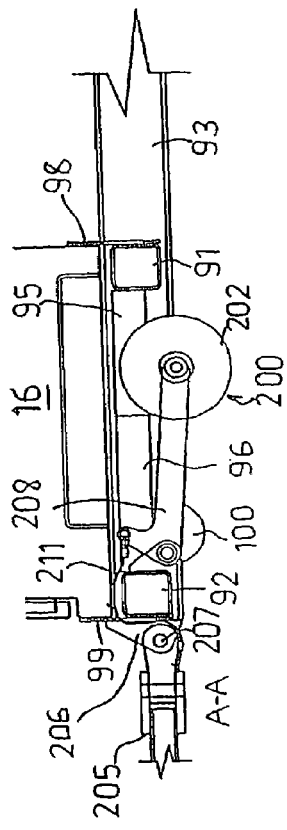
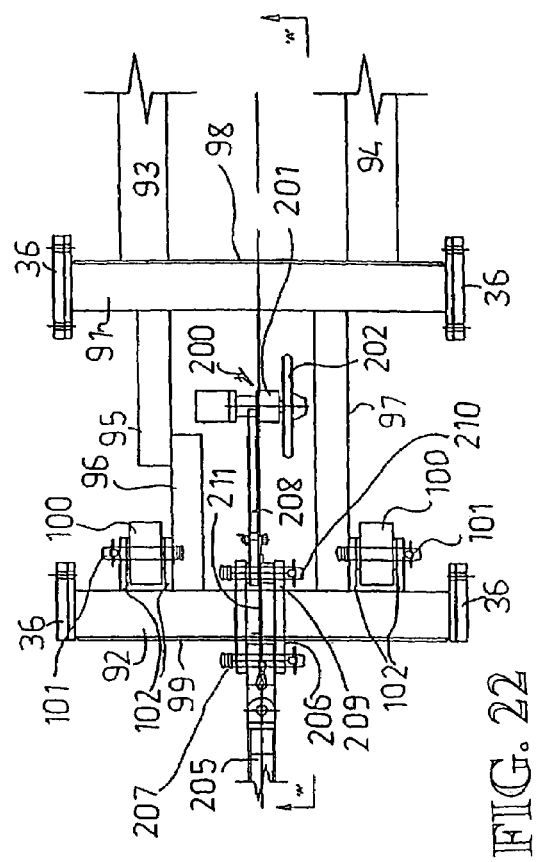

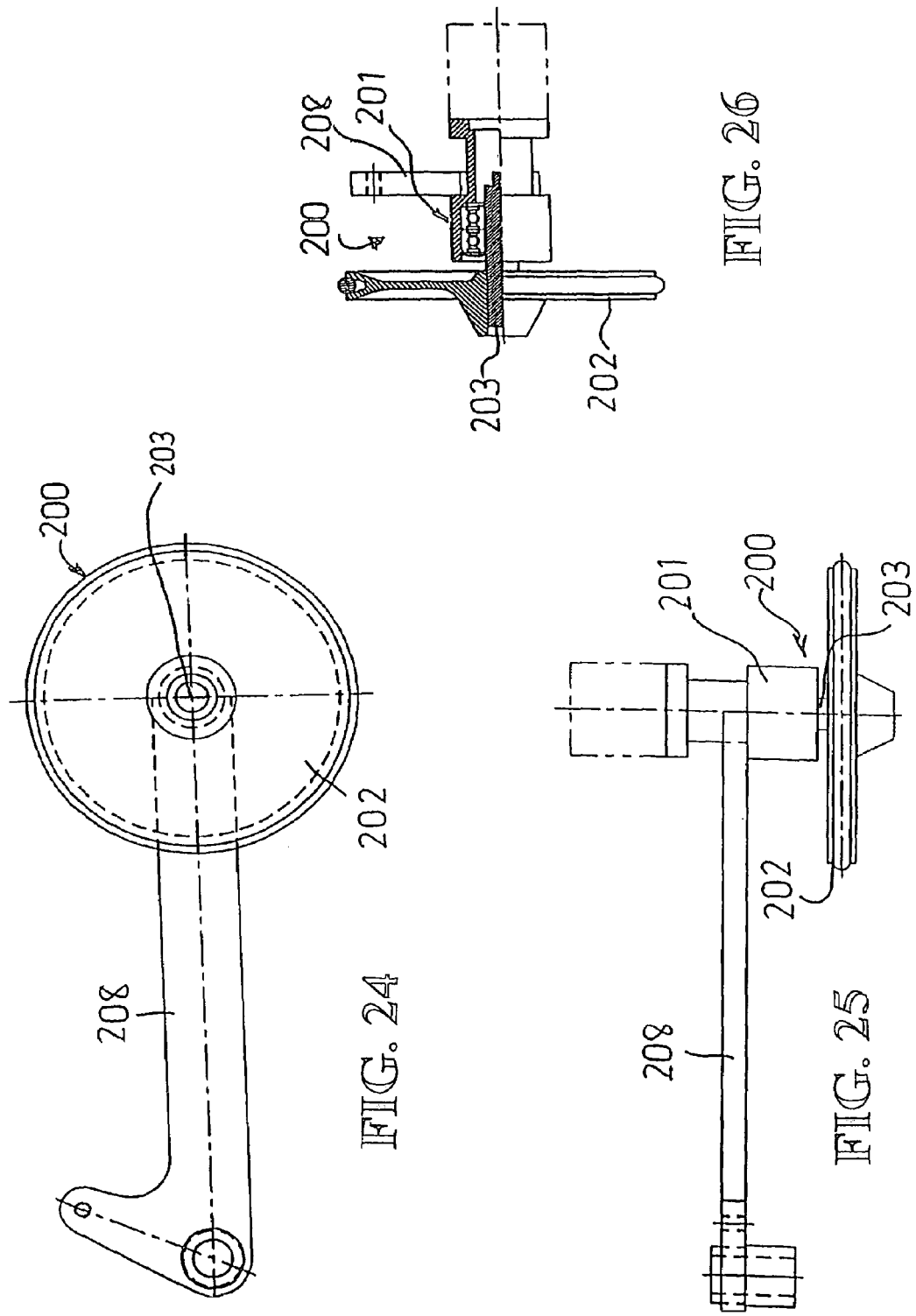

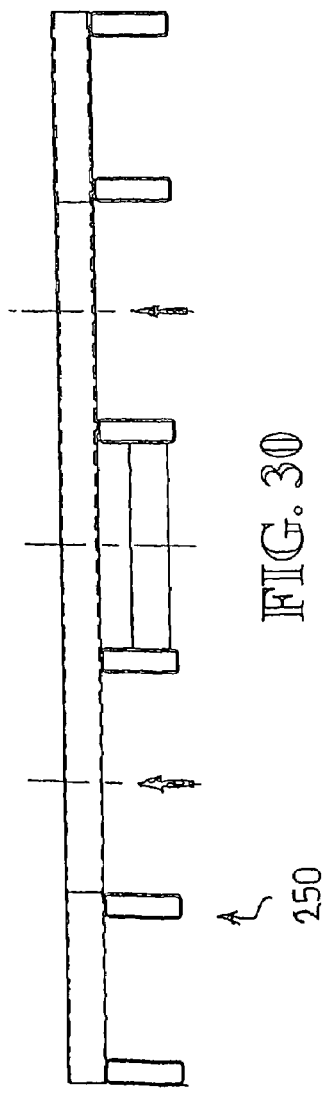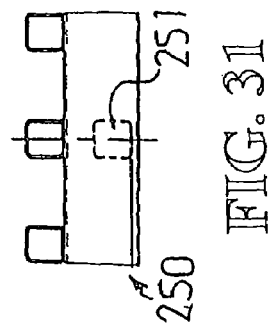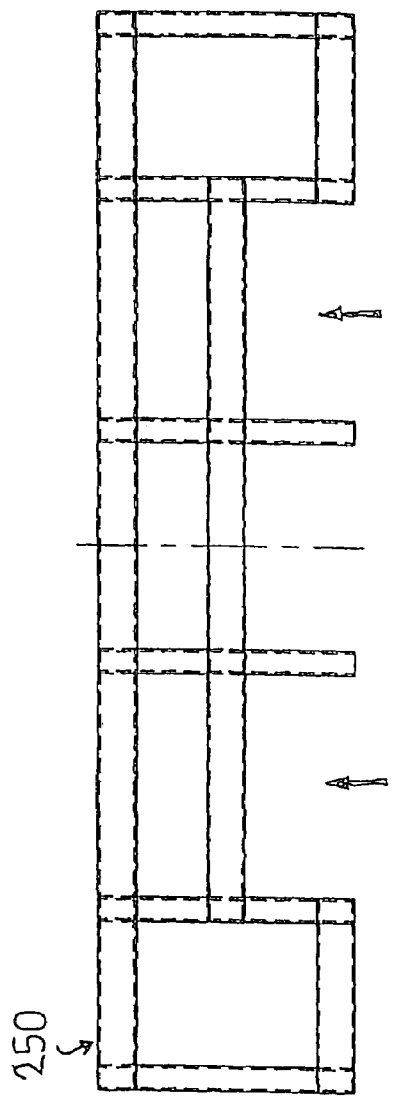

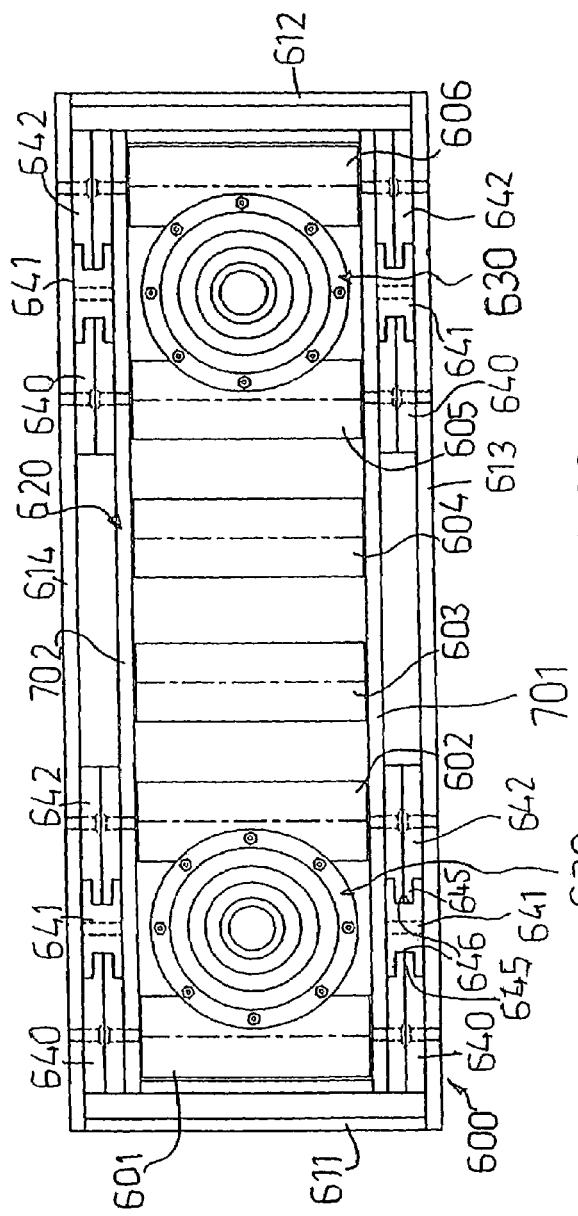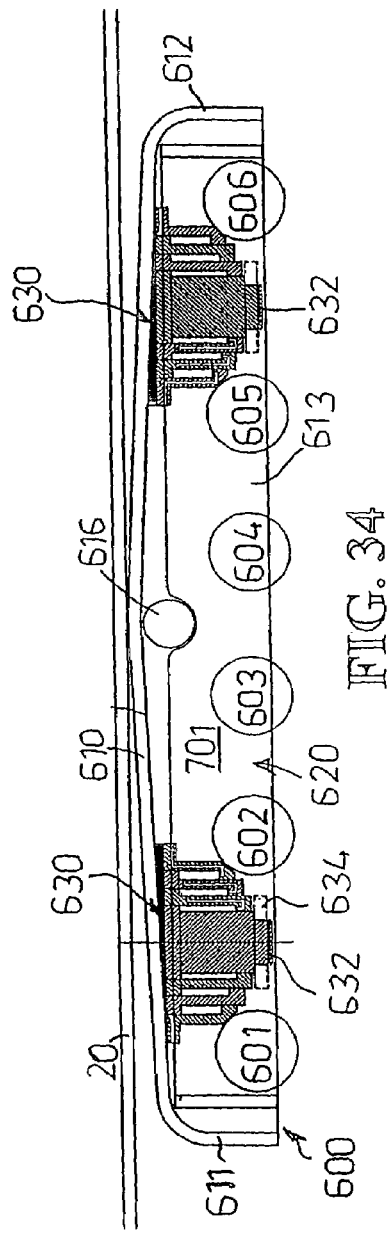
FIG. 33
FIG. 34

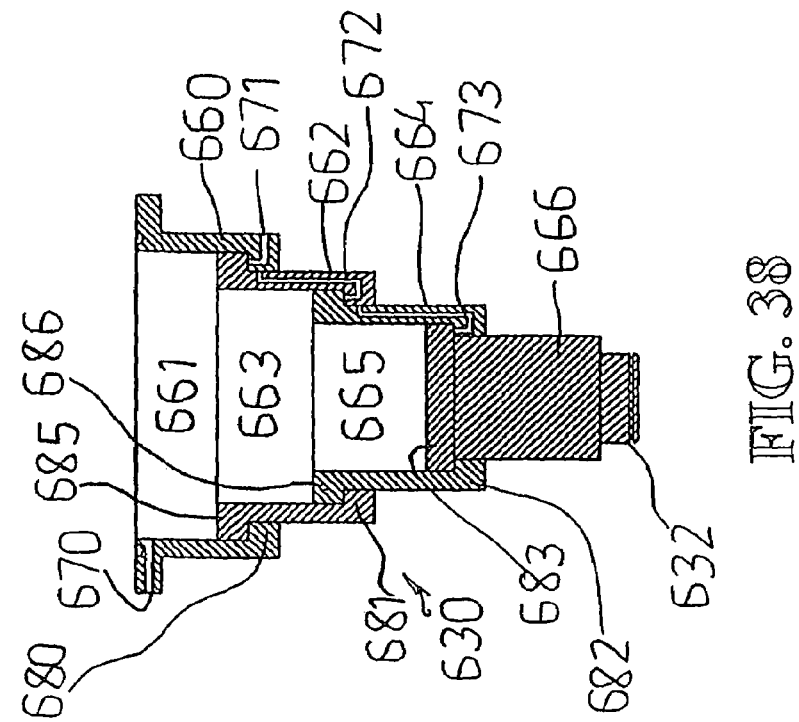
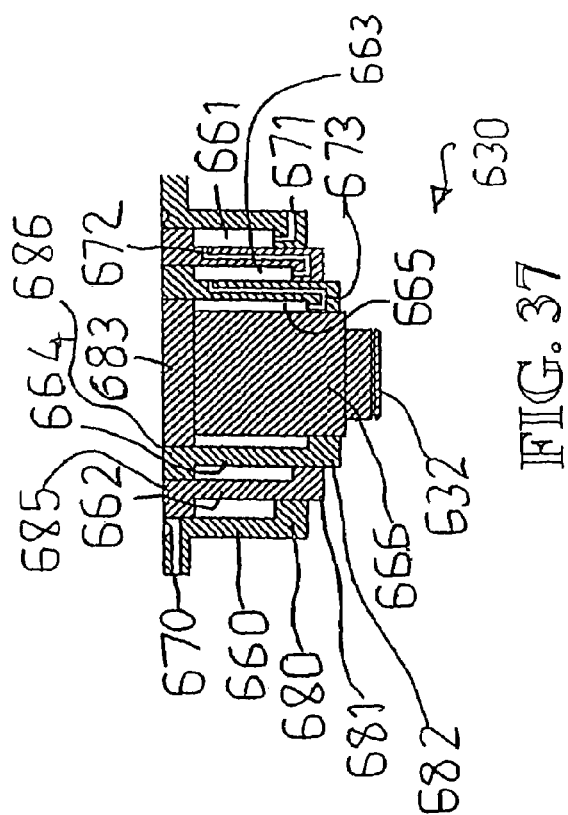
FIG. 37
FIG. 38

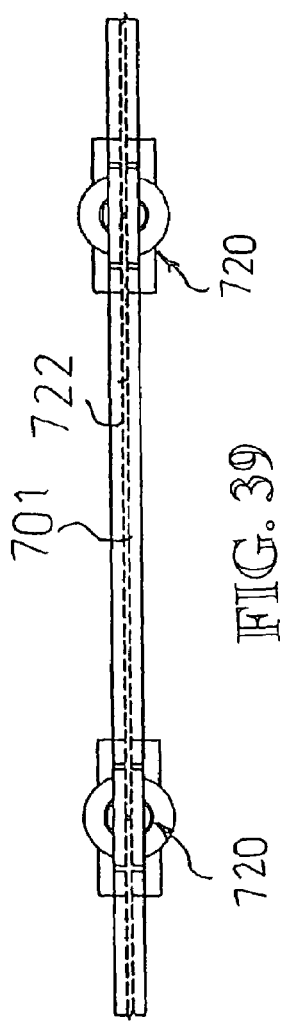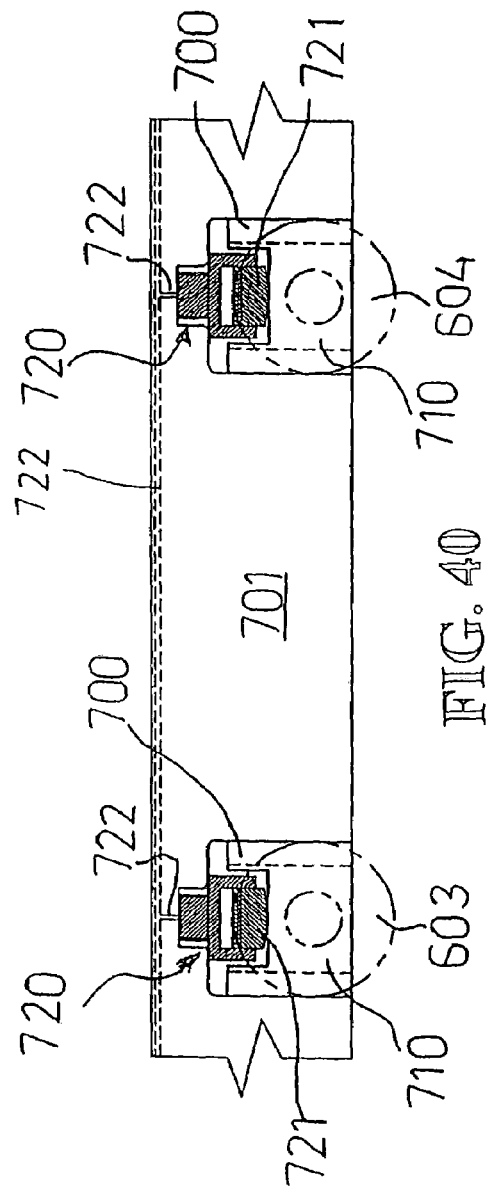

STEERABLE TRANSPORT TROLLEY

RELATED PATENT DATA

This application claims priority from Australian Patent application Ser. No. PS 0458, filed on Feb. 12, 2002; Australia Patent application Ser. No. 2002952422, filed on Nov. 1, 2002; and Australian PCT application PCT/AU03/00173, filed Feb. 12, 2003 and which designates the United States of America.

TECHNICAL FIELD

This invention relates to a trolley for transporting cargo. In particular, the invention concerns a trolley for transporting palletised cargo into and out of a container.

BACKGROUND ART

Trolleys for transporting palletised cargo are known. In practice there are difficulties associated with loading cargo into and out of a shipping container, particularly where loads of about 30 tonnes and 12 m in length are involved. For instance, due to poor visibility, it may be difficult to steer a cargo-laden trolley into a standard size shipping container without colliding with and damaging a sidewall of the container or damaging the cargo. In order to ninimize the chance of a collision occurring, usually there is a relatively large clearance between the cargo and the container sidewalls, but having such a large clearance between both sidewalls and the cargo creates the problem of inefficient usage of the container.

It is therefore an object of the present invention to provide a transport trolley that overcomes or at least minimises a problem referred to above.

DISCLOSURE OF INVENTION

According to a first aspect of the present invention, there is provided a transport trolley having:
  at least two interconnected, parallel, spaced forks;
  ground-engaging rollers mounted to the forks; and
  a steering system including:
  distance monitors connected to at least one of the forks for monitoring the distance between the at least one fork (hereafter referred to as the "monitoring fork") and at least one sidewall of a container;
  a drive system for steering the rollers relative to the forks, and
  an electronic control system, operatively connected to the distance monitors and the drive system, for activating the drive system such that the monitoring fork may be maintained at a pre-set distance from the container sidewall.

Any suitable type of distance monitor may be used. Each distance monitor may be, for example, an ultrasonic sensor. Each distance monitor may be, for example, a photoelectric sensor, such as a laser sensor or an infrared sensor, such as the KM1 series of amplifier built-in analog sensors sold by Pepperl+Fuchs Australia Pty Ltd, or the WTA 24 photoelectric proximity switches with analog output series (model number WTA 24-P5201 S01) which is sold by Sick Pty Ltd. Details of the aforementioned distance monitors and other suitable distance monitors may be found at the web sites http://www-.pepperl-fuchs.com/ and http://www.sick.de/de/en.html.

The steering system may have two distance monitors connected to the monitoring fork for monitoring the distance between the monitoring fork and a single sidewall of the container. Preferably, a first distance monitor is mounted to a forward region of the monitoring fork and a second distance monitor is mounted to a central or rearward region of the monitoring fork. More preferably, the distance monitors are connected to load supports of the monitoring fork.

The distance monitors may be connected to the fork in any suitable way. If necessary, the trolley may have further distance monitors connected to the monitoring fork or to the other fork such that the distance between both forks and both container sidewalls is monitored Any suitable drive system for steering the rollers relative to the forks may be used. Preferably, the drive system includes hydraulic steering cylinders that steer the rollers. A piston of each hydraulic steering cylinder may be movable between three positions, wherein in a mid position the trolley is steered straight, in an extended position the trolley is steered left, and in a retracted position the trolley is steered right.

The trolley may further have roller housings for containing the rollers. The roller housings may be mounted to the forks in any suitable way. Preferably, each said roller housing has a mounting pin for mounting to a said fork. More preferably, the roller housings are mounted to the load supports of the forks, but the roller housings may also be mounted to other regions of the forks.

A piston of a steering cylinder may be connected to a first end of a said mounting pin and may move the first end relative to a second end of the mounting pin. This arrangement may steer the pin about 0.75 degrees off centre. The piston may be connected to the mounting pin in any suitable way. For example, both the first and second ends of the mounting pin may be located within spherical bearings of the fork, and the spherical bearing at the first end may be slidably mounted to the fork.

In another embodiment of the invention, a piston of a first steering cylinder may be connected to a first end of a said mounting pin, and a piston of a second steering cylinder may be connected to a second end of the mounting pin, and as one piston extends, the other piston retracts. This arrangement may steer the pin about 1.5 degrees off centre. Both the first and second ends of the mounting pin may be located within spherical bearings of the fork and both said spherical bearings may be slidably mounted to the fork.

Preferably, each said roller housing of the monitoring fork is situated adjacent a said distance monitor. Preferably, the roller housings at the forward region of the trolley can be steered independently of the roller housings at the central or rearward region of the trolley.

The electronic control system may enable the steering of the trolley to be carried out automatically or manually. Preferably, the electronic control system automatically activates the drive system to correct the direction of travel of the trolley when the monitoring fork has moved from the pre-set distance from the container sidewall. Manual steering of the trolley may be of importance when precision steering is not necessary or when there is a systems fault with the automatic steering.

The electronic control system preferably includes a control panel and a display whereby an operator of the trolley may be informed of both the position of the monitoring fork relative to the container sidewall and that the correct direction of steering is being employed. The control panel and display may enable the operator to steer the trolley manually. Any suitable control panel(s) and display(s) may be used. The control panel may be connected to circuitry within a control tower of the trolley by a cable. Alternatively, the control panel may communicate with a sensor within the control tower using wireless technology, such as infrared light.

The electronic control system is preferably programmable such that the pre-set distance may be inputted and altered as needed. Preferably, the pre-set distance is programmed by scanning a reflector guard of suitable profile with the distance monitor at the forward region of the monitoring fork. The reflector guard may be positioned outside the container and within the plane of the sidewall, and the reflector guard may have a substantially identical profile to that of the container sidewall.

The pre-set distance may be defined by a maximum allowable distance and a minimum allowable distance from the container sidewall.

Since most container sidewalls are corrugated, the reflector guard may also be corrugated, and the corrugated profile will be taken into account when programming the pre-set distance for the distance monitor. Steering may be achieved by periodically taking maximum and minimum distance readings, then taking an average of those readings and steering to a longitudinally extending central plane of the corrugations.

If the trolley is being propelled by, say, a forklift, then the reverse lights (or other type of warning device activated when reversing) may be operatively connected to the electronic control system for coordination therewith.

The trolley may include an incremental rotary encoder, operatively connected to the electronic control system for coordination therewith, for monitoring the traveling direction of the trolley, the distance traveled by the trolley and the speed of the trolley. The encoder may be, for example, model number RIB-50-0500-Z-T which is sold by Bell Electronics. The encoder may be connected to a ground-contacting wheel (eg. roller), and as the wheel rotates, the encoder signals the direction of travel and the distance covered by the trolley. By knowing the diameter of the wheel, the encoder also enables the speed of the trolley to be calculated. Such parameters may be displayed on a display of the electronic control system. The wheel may be pivoted out of contact with the ground when the trolley is not in use so as to avoid damage to the encoder. The wheel may be pivotally mounted to a rear end of the trolley.

The forks may be of any suitable shape, size and construction. Preferably, the forks are shaped for insertion between the blocks of a single-decked pallet. The trolley may have any suitable number of forks. Preferably, the trolley has two forks.

Each fork may have any suitable number of load supports. The number of load supports may depend on the length of the forks and the nature of the palletised cargo that the trolley is to transport. Typically, a trolley for transporting loads about 12 m in length will have two load supports per fork, whereas trolleys for transporting 18 m loads will have three load supports per fork.

Preferably, each fork has a first load support and a second load support. The first and second load supports may be located immediately adjacent one another or they may be spaced from one another. Preferably, the first load support is located at the forward region of each said fork and the second load support is located at the central or rearward region of each said fork. If the second load support is located at the central region, then the trolley may further have one or more ground-contacting wheels mounted to the rear end of the trolley.

Each fork may have a first spacer arm for spacing the first load support from the second load support. The first spacer arm may be of any suitable size, length and construction, it may be adjustable in length, and it may be detachably attachable to the first and/or second load supports. The first spacer arm may have a top wall, a bottom wall and sidewalls. The first spacer arm may, for instance, consist of box steel.

If necessary, a stiffening member may extend through each first spacer arm from the first load support to the second load support.

Each fork may include a second spacer arm extending from the second load support to the rear end of the trolley. This arm may be of any suitable size, length and construction, it may be adjustable in length, and it may be detachably attachable to the second load support. Preferably, the second spacer arm is of similar construction to the first spacer arm and has a top wall, a bottom wall and sidewalls. The second spacer arm may, for instance, consist of box steel. If necessary, a stiffening member may extend through each such arm.

If each fork of the trolley has more than two load supports, then each fork may have additional spacer arms.

The first and second load supports may be of any suitable shape, size and construction. Preferably, the first and second load supports are of similar construction, and the first and second load supports of one fork are substantially mirror images of the first and second load supports of the other fork.

Preferably, each said load support includes a top wall, a bottom wall having an opening through which a said roller housing extends, and sidewalls and end walls surrounding the roller housing. The top wall, when viewed from above, is preferably octagonal in shape.

Each load support may further have strengthening walls intermediate the top and bottom walls. The top walls of the first and second load supports may be situated above the first and second spacer arms so that the arms are not under load.

Preferably, each said load support further includes a peripheral skirt extending between the top and bottom walls. The skirt may partly or fully surround the sidewalls, end walls and intermediate walls. One or more sections of the skirt may be detachable from the top and bottom walls so that an interior of the load support may be accessed.

The trolley may have a control tower having one or more compartments for containing, for example, controls such as the control panel and display, a motor, hydraulic components, electronic components, a battery.

The forks may be interconnected in any suitable way. The forks are preferably interconnected at the rear end of the trolley by a connecting frame. The connecting frame may be of any suitable construction. The connecting frame may have frame members extending between the forks and extending parallel to the forks. The frame members may, for example, consist of metal beams screwed and/or welded to one another and to the forks. The connecting frame may further include plates for connecting the control tower to the frame members.

The roller housings may be of any suitable shape, size and construction. If necessary, additional roller housings may be mounted to parts of the forks other than to the load supports. The roller housings may be pivotable relative to the load supports.

Preferably, each roller housing has a pitched roof with sidewalls and end walls extending from the roof. The pitched roof provides the roller housing with additional space for rocking.

Preferably, the mounting pin extends through said sidewalls of said roller housing and said sidewalls of the respective load support, and the roof may pivot relative to the mounting pin. In this way, the roller housing may pivot in a rocking motion beneath the top wall of the load support.

Any suitable number of rollers may be mounted within each roller housing. Any suitable type of roller may be used. (The term "roller" as used herein is to be understood as being synonymous with the term "wheel"). The rollers may be mounted in any suitable way. Preferably, each roller housing includes forked roller frames and pins for connecting the rollers to the forked roller frames and for connecting the forked roller frames to the sidewalls of the roller housing.

In one embodiment, forward-, mid- and rearward-pairs of rollers are mounted within each roller housing. In another embodiment, the forward- and rearward-pairs of rollers of each roller housing are substituted for single, more elongate rollers. Such rollers may reduce the amount of damage to the ground over which the trolley travels. In yet another embodiment, each roller housing has one or more additional rollers (idlers) for load sharing purposes. In a preferred embodiment, each roller housing has a single forward roller, a single rearward roller, and a mid-pair of rollers.

The height of the load supports may be adjustable and this may be achieved in any suitable way. Preferably, the load supports are height adjustable by extending and retracting the rollers relative to the roller housings. To this end, each roller housing preferably includes forked roller frames that are pivotally connected to the sidewalls of the roller housing.

The rollers may be extended and retracted by any suitable mechanism. Preferably, each said roller housing includes a hydraulic lifting cylinder for moving the rollers between extended and retracted positions. A housing of the lifting cylinder may be pivotally connected to the roof and a piston of the cylinder may be pivotally connected to a said pin connecting the mid-pair of rollers to their respective forked roller frames.

Preferably, the rollers of a roller housing are pivoted in unison. To this end, each said roller housing may have tie members interconnecting the rollers such that when the mid-pair of rollers pivots, all of the rollers of the roller housing pivot. Each roller housing may further include a pivotable tie support member extending between each said tie member and a sidewall or roof of the roller housing. The tie support members may help prevent the tie members from buckling when under load. Preferably, for load sharing purposes, each roller housing further includes three idlers connected to the tie members.

The trolley may have pressure sensors for confirming that a load has been fully lifted or fully lowered. Such sensors are known in the art. The lifting cylinders may be controlled using the control panel.

In order to load the trolley with cargo, the forks may be positioned between blocks of a pallet carrying cargo with the rollers in the retracted position, and in order to lift the palletised cargo, the rollers may be moved to the extended position, at which time the load supports bear against deckboards of the pallet.

The trolley may have a motor such that the trolley is self-propelling. The motor may be located at the rear end of the trolley. The motor may power the hydraulic lifting cylinders and the steering cylinders. Alternatively, the trolley may be propelled manually or by any vehicle having sufficient tractive effort and braking capacity. The trolley may be propelled by, for example, a forklift truck or by a hydraulic arm of a crane. The rear end of the trolley may be coupled to the forklift truck or to the hydraulic arm of a crane in any suitable way. For instance, the second spacer arms may have pockets for tynes of a forklift truck at the rear end of the trolley, and/or the trolley may be coupled to a forklift truck with a chain. The forklift truck or crane may power the hydraulic and electrical systems of the trolley. Preferably, the display is housed by the control tower and is visible to an operator of the forklift truck, and the control panel is operable from within the forklift truck

BRIEF DESCRIPTION OF DRAWINGS

FIG. 2 is a side elevation view of the trolley of FIG. 1 (with some details omitted) with a front end of the trolley raised relative to a rear end of the trolley;

FIG. 3 is a plan view of the trolley of FIG. 1 (with some details omitted);

FIG. 4 represents front end views of part of the trolley of FIG. 1 when raised (a) and lowered (b);

FIG. 5 is a part detailed top plan view of a rear load support of the trolley of FIG. 1;

FIG. 6 is a part detailed side elevation view of FIG. 5;

FIG. 7 is a part detailed side elevation view of FIG. 5 but rotated 180 degrees about the horizontal plane;

FIG. 8 is a detailed end view of FIG. 7;

FIG. 9 is a transverse sectional view taken through plane A-A of FIG. 5;

FIG. 10 is a detailed top plan view of a roller housing and rollers of the trolley of FIG. 1 with the rollers in a retracted position;

FIG. 11 is a detailed side elevation view of FIG. 10;

FIG. 12 is the same as FIG. 10 but with the rollers in an extended position;

FIG. 13 is a detailed side elevation view of FIG. 12;

FIG. 17 is a detailed side elevation view of a hydraulic steering cylinder of the trolley shown in FIG. 1;

FIG. 18 is a detailed front elevation view of FIG. 17;

FIG. 19 is a detailed rear elevation view of FIG. 17;

FIG. 20 is a partly detailed exploded plan view of FIG. 17;

FIG. 21 is a detailed side elevation view of a cylinder housing of the hydraulic steering cylinder shown in FIG. 17;

FIG. 22 is a detailed plan view of a rear part of the trolley of FIG. 1,

FIG. 23 is a sectional side elevation view taken through plane A-A of FIG. 22;

FIG. 24 is a detailed side elevation view of an incremental rotary encoder and wheel assembly of the trolley of FIG. 1;

FIG. 25 is a detailed top plan view of FIG. 24;

FIG. 26 is a partly cross sectioned end view of FIG. 24;

FIG. 30 is a part detailed front elevation view of a pallet for use with the trolley of FIG. 1, according to an embodiment of the invention;

FIG. 31 is a detailed side elevation view of part of the pallet of FIG. 30;

FIG. 32 is a detailed plan view of the pallet of FIG. 30;

FIG. 33 is a detailed top plan view of part of a roller housing for the trolley of FIG. 1 according to another embodiment of the invention, and the rollers are shown in a retracted position;

FIG. 34 is a detailed side elevation view of FIG. 33;

FIG. 37 is a sectional view of a hydraulic ram of the roller housing shown in FIG. 33 when in a fully retracted position;

FIG. 38 shows the hydraulic ram of FIG. 37 when in a fully extended position;

FIG. 39 is a detailed plan view of part of the roller housing and rollers shown in FIG. 33;

FIG. 40 is a detailed side elevation view of part of the roller housing and rollers shown in FIG. 33.

BEST MODES FOR CARRYING OUT THE INVENTION

Figure 1:
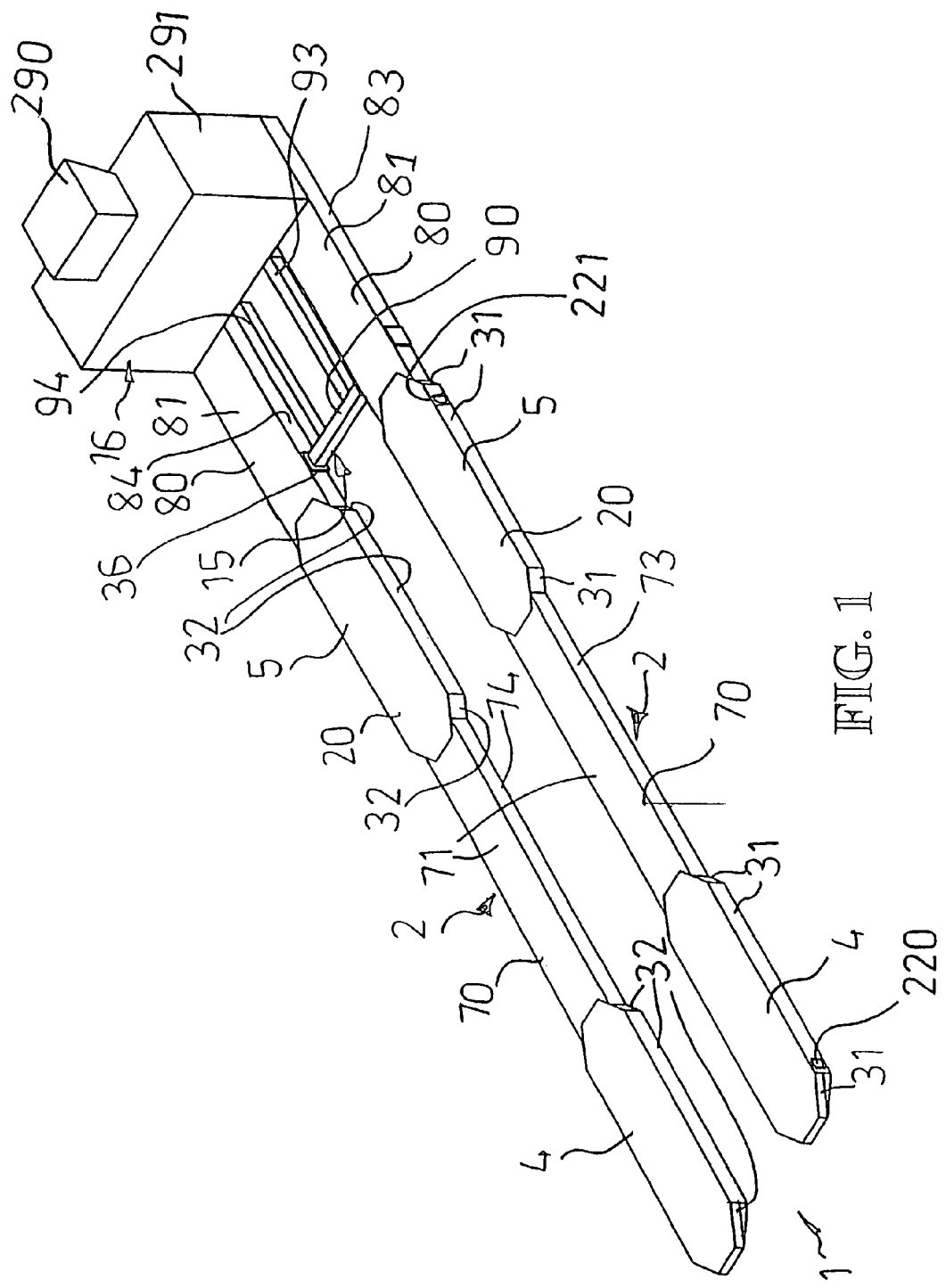
FIG. 1 is a front isometric view of a transport trolley (with some details omitted) according to an embodiment of the invention.

In the drawings like reference numerals refer to like parts.

FIGS. 1 to 3 show a trolley 1 for transporting palletised cargo. The trolley 1 has two parallel spaced forks 2 each having two load supports 4, 5, a roller housing 6 pivotally connected to each load support 4, 5, and rollers 7, 8, 9, 10, 11, 12, 13 mounted within each roller housing 6. A connecting frame 15 interconnects the forks 2 at a rear end of the trolley 1. A control tower 16, having multiple storage compartments, is connected to the frame 15.

A first pair of load supports 4 is located at a front end of the trolley 1 and a second pair of load supports 5 is located between the first pair 4 and the rear end of the trolley 1. The first 4 and second 5 pairs of load supports are of similar construction, and the load supports 4, 5 of one fork 2 are substantially mirror images of the load supports 4, 5 of the other fork 2. When viewed in plan, each load support 4, 5 is of octagonal appearance.

Referring now chiefly to FIGS. 5 to 9, each second load support 5 has a top wall 20, a bottom wall 21 having an opening 22 through which the roller housing 6 extends, as well as a pair of sidewalls 23, 25 and a pair of end walls 24, 26 that surround the roller housing 6. Further structural walls 27, 28, 29, 30 intermediate the top 20 and bottom walls 21 extend from end walls 24 and 26. The bottom wall 21 has a flat central portion 380, ramp portions 381, 382 extending upwardly from portion 380, and flat portions 383, 384 extending from ramp portions 381 and 382.

Figure 14:
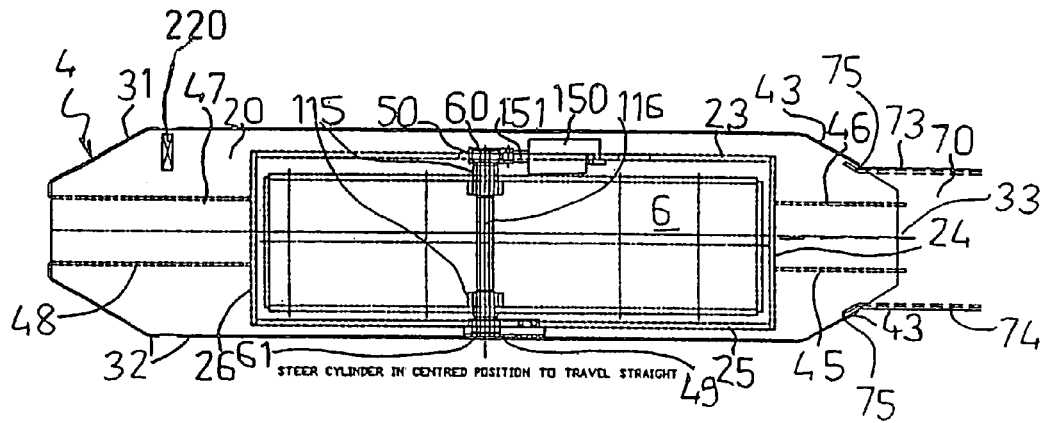
FIG. 14 is a detailed top plan view chiefly of a front load support and roller housing of the trolley of FIG. 1 when steered straight.

The first load supports 4 are shown in detail in FIG. 14. Each first load support 4 includes a top wall 20, a bottom wall (not shown) having an opening through which the roller housing 6 extends, as well as sidewalls 23, 25 and end walls 24, 26 that surround the roller housing 6. Further structural walls 45, 46, 47, 48 intermediate the top 20 and bottom walls extend from end walls 24 and 26.

Casings 49, 50 containing spherical bearings 60, 61 are located within openings of sidewalls 23 and 25. Identical casings and spherical bearings are located in sidewalls 23 and 25 of each second load support 5. The openings are clearly shown for load support 5 in FIGS. 6 and 7, and have been labeled with numerals 51 and 52.

As seen in FIG. 1, a peripheral skirt 31, 32 extends between the top 20 and bottom 21 walls and surrounds walls 23, 24, 25, 26, 27, 28, 29, 30, 45, 46, 47, 48. Brackets (not shown) extend from the top 20 and bottom 21 walls, and sections of the skirt 31, 32 are detachably attached thereto with screws. The skirt 31, 32 sections may be removed for ready access to internal parts of the load supports 4, 5.

Referring now to FIGS. 1 to 3 and 14, a first spacer arm 70 spaces the first load support 4 from the second load support 5. The first spacer arms 70 of each fork 2 are of similar construction, each having a top wall 71, a bottom wall 72 and a pair of sidewalls 73, 74. As seen in FIG. 14, an end portion 75 of each sidewall 73, 74 flares outwardly and locks behind inwardly directed portions 43 of the skirt 31, 32 of load support 4. Portions 75 are welded to portions 43. The other ends of sidewalls 73 and 74 extend alongside walls 29 and 30 of load support 5 and are welded to end wall 26 (see FIG. 5).

As seen in FIGS. 14 and 5, a stiffening member 33 extends through first spacer arm 70 from end wall 24 of the first load support 4 to end wall 26 of the second load support 5.

A second spacer arm 80 extends from each second load support 5 to the rear end of the trolley 1. This is shown in FIGS. 1 to 3. The second spacer arms 80 are of similar construction to one another and to the first spacer arms 70 in that they each have a top wall 81, a bottom wall 82 and a pair of sidewalls 83, 84. An end portion of each sidewall 83, 84 flares outwardly and locks behind inwardly directed portions of the skirt 31, 32 (not shown), as described earlier for load support 4. As seen in FIG. 5, stiffening member 85 extends within spacer arm 80 to end wall 24 of the second load support 5.

The top walls 20 of the load supports 4, 5 are slightly raised relative to the top walls 71, 81 of the spacer arms 70, 80 as the load supports 4, 5 bear the load.

The load supports 4, 5 and spacer arms 70, 80 consist of steel plates fitted and welded together. Stainless steel can be used for those parts of the trolley 1 exposed to corrosive agents. The stiffening members 33, 85 each consist of a metal plate welded on its bottom edge to the bottom walls 21, 72, 82.

As seen in FIGS. 1, 3, 22 and 23, the connecting frame 15 has three frame members 90, 91, 92 extending between the forks 2, various frame members 93, 94, 95, 96, 97 extending parallel to the forks 2 between frame members 90, 91 and 92, and plates 98, 99. Frame members 90, 91, 92, 93, 94, 95, 96 and 97 consist of metal beams and these are screwed and/or welded to one another and to the sidewalls 84 of spacer arms 80. Frame members 90, 91 and 92 have end flanges 36 for bolting to sidewalls 84. Front 98 and rear plates 99 connect the control tower 16 to frame members 91 and 92.

A pair of ground-contacting wheels 100 are connected to forked frames 102 with pins 101, and the forked frames 102 are connected to frame members 92, 96 and 97.

Referring now to FIGS. 10, 11, 12, 13 and 14, each roller housing 6 has a slightly pitched roof 110, a pair of end walls 111, 112 and a pair of sidewalls 113, 114. A bush 115 is located at each sidewall 113, 114. A pin 116 extends through the bushes 115 and into the spherical bearings 60, 61 such that the roller housing 6 may pivot beneath the top plate 20 of the load support 4, 5.

Each roller housing 6 has carbon-steel rollers 7, 8, 9, 10, 11, 12, 13 that may be extended from the housing 6 and partly retracted into the housing 6. Four forked roller frames 120, 121, 122, 123 are pivotally connected to the sidewalls 113, 114 with pins 125, 126, 127 that extend through sleeves 130, 131, 132, 133 of the forked roller frames 120, 121, 122, 123 and further through openings of the sidewalls 113, 114. A forward roller 7 is pinned to forked roller frame 120, a mid-pair of rollers 9, 10 is pinned to forked roller frames 121 and 122 with a single pin 144, and a single rearward roller 13 is pinned to forked roller frame 123.

A pair of tie rods 180, 181 is pinned to each of the forked roller frames 120, 121, 122, 123 so that the rollers 7, 8, 9, 10, 11, 12, 13 pivot in unison. Idler rollers 8, 11 and 12 are pinned to the tie rods 180, 181 and help distribute the load. A pair of pivotable tie rod support members 135, 136 prevent the tie rods 180, 181 from buckling when the rollers 7, 8, 9, 10, 11, 12, 13 have been extended and the trolley 1 is under load. An upper end of each tie rod support member 135, 136 is pinned to a roller housing sidewall 113, 114 and a lower end of each tie rod support member 135, 136 is pinned to a tie rod 180, 181.

Hydraulic lifting cylinders 140 extend and retract the rollers 7, 8, 9, 10, 11, 12, 13 in unison relative to the roller housing 6 such that the trolley 1 may be raised and lowered. A bracket 141 extends from the roof 110 of the roller housing 6 and an end of the lifting cylinder 140 is pivotally mounted thereto with a pin 142. A piston 143 of the lifting cylinder 140 is pivotally connected to pin 144 by way of pin 144 extending through an end ring of the piston 143. When the piston 143 of the lifting cylinder extends 140, the rollers 7, 8, 9, 10, 11, 12, 13 extend some 35 mm (as seen in FIGS. 12 and 13) relative to a fully retracted position (as seen in FIGS. 10 and 11).

The forks 2 are shaped for insertion between the blocks of a single-decked pallet and the load supports 4, 5 can raise the deckboards of the pallet. FIGS. 30, 31 and 32 show a suitably configured pallet 250 for use with the trolley. The arrows shown in FIGS. 30 and 32 indicate entry points for the forks 2.

The trolley 1 may be propelled by a forklift truck. Tynes of a forklift truck (not shown) may engage openings provided by spacer arms 80 at the rear end of the trolley 1. The forklift truck may be further chained or otherwise secured to the trolley 1 so that the trolley 1 may be pulled in reverse.

The trolley 1 has a steering system for steering both the front and rear roller housings 6, and for steering the front roller housings 6 independently of the rear roller housings 6. The steering system includes: a drive system for actually turning the roller housings 6; distance monitors for monitoring the distance between the trolley 1 and a nearby object, such as a container sidewall; an incremental rotary encoder for monitoring the traveling direction of the trolley 1, the distance traveled by the trolley 1 and the speed of the trolley 1; and, an electronic control system for coordinating and controlling the said components of the steering system.

Figure 15:
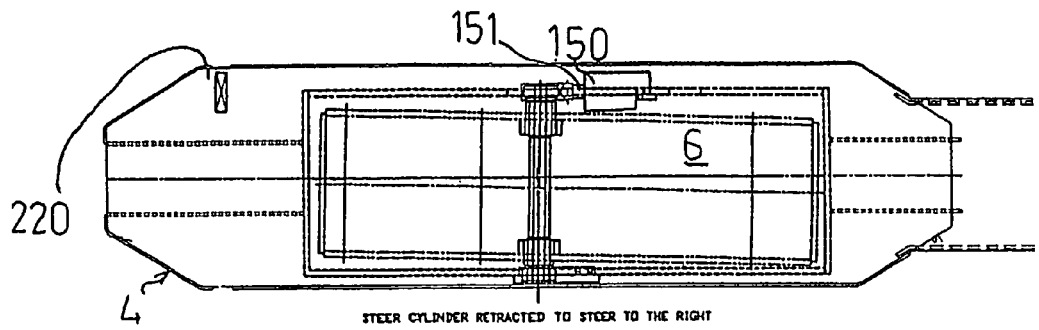
FIG. 15 is the same as FIG. 14 but the roller housing is being steered to the right.
Figure 16:
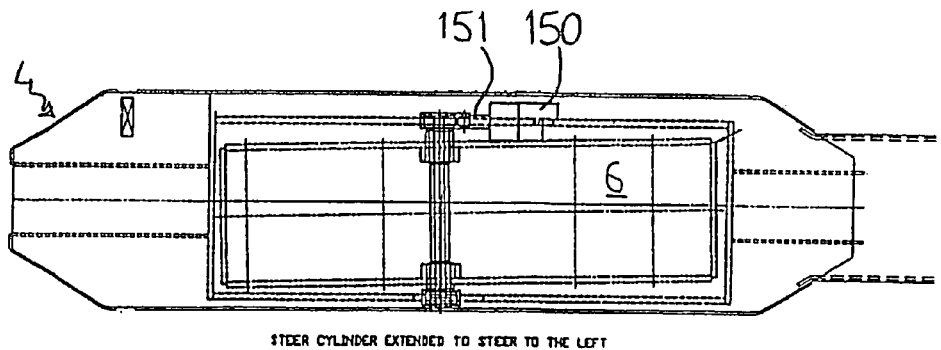
FIG. 16 is the same as FIG. 14 but the roller housing is being steered to the left.

The drive system is illustrated in FIGS. 14, 15 and 16, and includes hydraulic steering cylinders 150 for steering the roller housings 6. Each roller housing 6 is steered by a single steering cylinder 150 in a similar manner. Referring now to FIG. 7, steering cylinder 150 is mounted within opening 51 of sidewall 23 of each load support 4, 5. Casing 50 for spherical bearing 60 is also located within the opening 51 and the casing 50 is connected to a piston 151 of the steering cylinder 150. Upper and lower edges of the sidewall 23 defining the opening 51 are located within longitudinal grooves (not shown) of the casing 50, and this arrangement enables the casing 50 to slide within the opening 51 in a controlled manner when the piston 151 of the steering cylinder 150 extends and retracts. The piston 151 has an 8 mm stroke. Whilst spherical bearing 60 and casing 50 are slidable by the piston 151, the other spherical bearing 61 and casing 49, mounted within opening 52 at the other end of pin 116, are not slidable.

The piston 151 is movable between three positions. In a mid (neutral) position the roller housing 6 is steered straight, as see in FIG. 14. In an extended position the roller housing 6 is steered left about 0.75 degrees relative to the mid position, as seen in FIG. 16, and in a retracted position the roller housing 6 is steered right about 0.75 degrees relative to the mid position, as seen in FIG. 15.

FIGS. 17 to 21 show details of the hydraulic steering cylinder 150. The steering cylinder 150 has a body 160 containing a large bore 161 and a small bore 162 (best seen in FIG. 21). A shoulder 163 is present at the point where the large bore 161 and the small bore 162 meet. Large bore 161 has a proximal end 164 at the shoulder 163 and a distal end 165. Small bore 162 has a proximal end 166 and a distal end 167 at the shoulder 163. A large floating piston 168 moves slidably on a shaft 169 within large bore 161 between the shoulder 163 and a gland 170 at the distal end 165 of the bore 161. A small piston 171, located within in small bore 162, is connected to an end of shaft 169. The small piston 171 moves slidably within the small bore 162 between the large piston 168 and an end wall 172 of the body 160. The shaft 169 moves slidably through part of the small bore 162, large bore 161 and gland 170. The shaft 169 has been referred to earlier as piston 151. O-rings extending about shaft 169 and pistons 168 and 171 have not been illustrated.

A first port 175 extends to the distal end 165 of large bore 161, a second port 177 extends to the proximal end 166 of small bore 162, and a third port 176 extends to the proximal end 164 of large bore 161. That is, ports 176 and 177 can direct hydraulic fluid to opposite sides of small piston 171, and ports 176 and 175 can direct hydraulic fluid to opposite sides of large floating piston 168.

Figure 29:
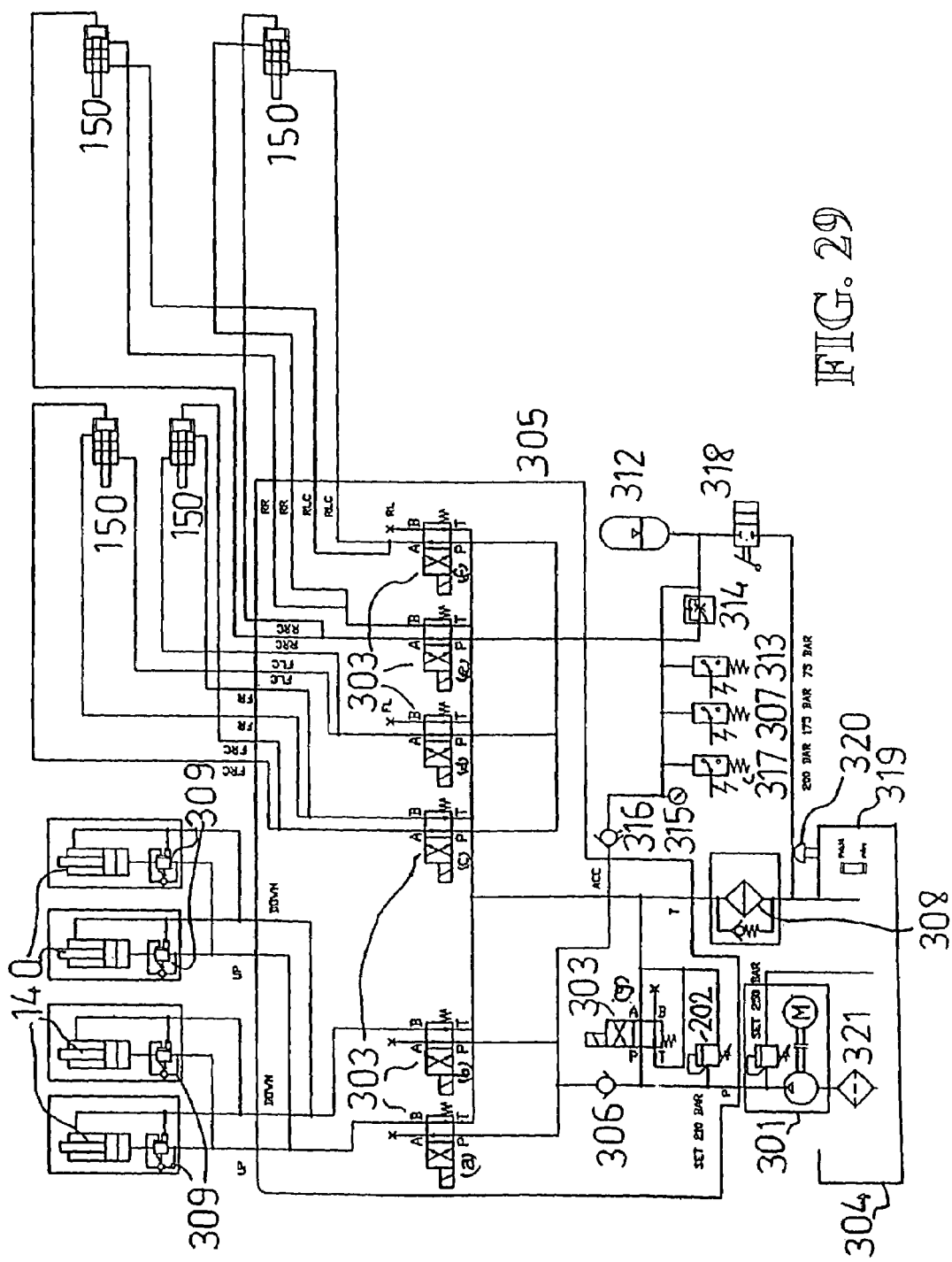
FIG. 29 is a hydraulic circuit diagram for the trolley of FIG. 1.

In order to place the piston 151 in the mid neutral position, hydraulic fluid is directed to the distal end 165 of large bore 161 via port 175. Hydraulic fluid from the proximal end 164 of large bore 161 is directed to reservoir assembly 304 (as shown in FIG. 29) via port 176. Hydraulic fluid is also directed to the proximal end 166 of small bore 162 via port 177. Since there is higher fluid pressure in large bore 161 than in small bore 162, large floating piston 168 is forced against the shoulder 163 and small piston 171 is forced against piston 168.

To extend the piston 151 and to steer the trolley 1 to the left, hydraulic fluid within the distal end 165 of bore 161 is directed via port 175 to the reservoir assembly 304, and as the distal end 165 is vacated of hydraulic fluid, the shaft 169 extends 8 mm from within the body 160. In order to return the piston 151 to the mid neutral position, hydraulic fluid is directed to the distal end 165 via port 175, and large floating piston 168 is again forced against shoulder 163.

In order to retract the piston 151 and to steer the trolley 1 to the right, hydraulic fluid is directed to the proximal end 164 of bore 161 via port 176, and hydraulic fluid within the proximal end 166 of small bore 162 is directed to reservoir assembly 304 via port 177. The shaft 169 slides through large floating piston 168 and the piston 151 retracts 8 mm. To return the piston 151 to the mid neutral position, hydraulic fluid is redirected to the proximal end 166 of bore 162 via port 177, hydraulic fluid within the proximal end 164 of bore 161 is directed to reservoir assembly 304 via port 176, and small piston 171 slides against large piston 168.

FIGS. 22, 23, 24, 25 and 26 show a pivotable wheel assembly 200 having the incremental rotary encoder 201 (model number RIB-50-0500-Z-T, marketed by Bell Electronics). As a ground-contacting wheel 202 of the wheel assembly 200 rotates, a drive shaft 203 rotates the encoder 201 and the encoder 201 signals the direction of travel and the distance covered by the trolley 1. By knowing the diameter of the wheel 202, the encoder 201 also enables the speed of the trolley 1 to be calculated. These parameters may be displayed on a display of the electronic control system.

The wheel 202 may be raised up off the ground when not in use. This may help prevent the encoder 201 from being damaged when the trolley 1 is being moved between locations and not for container loading purposes. A tow bar 205 is pivotally connected to a bracket 206 of rear plate 99 with a pin 207. A pivot arm 208 is connected to the encoder 201 and an end of the pivot arm 208 is pivotally connected to a bracket 209 of frame member 92 with a pin 210. A cable 211 extends through an opening of the rear plate 99 and over frame member 92, and has ends secured to both the tow bar 205 and an upper end of the pivot arm 208. When the tow bar 205 is raised, the pivot arm 208 raises the wheel 202 up off the ground.

Referring now to FIGS. 1, 2 and 14, a first distance monitor 220 is located within the front load support 4 and a second distance monitor 221 is located within the second load support 5. Each monitor 220, 221 is a photoelectric sensor (model number WTA 24-P5201 S01 marketed by Sick Pty Ltd) and emits a beam of light through an opening in skirt 31 of each load support 4, 5. The location of monitor 221 is approximately shown in FIGS. 5 and 7 by numeral 390. It may also be necessary to provide the pallet 250 with openings 251 (as shown in FIG. 31) so as to not impede the light beam emitted by each monitor 220, 221.

The electronic control system enables the steering of the trolley 1 to be carried out automatically or manually. The electronic control system automatically activates the steering cylinders 150 to correct the direction of travel of the trolley 1 when a fork 2 has moved from a pre-set distance from, say, a container sidewall. The pre-set distance is defined by a maximum distance allowable from the container sidewall and a minimum distance allowable from the container sidewall. Since containers are usually of constant width, only one container sidewall need be monitored. For simplicity and cost the monitors 220, 221 may only be mounted to a single fork 2.

Figure 28:
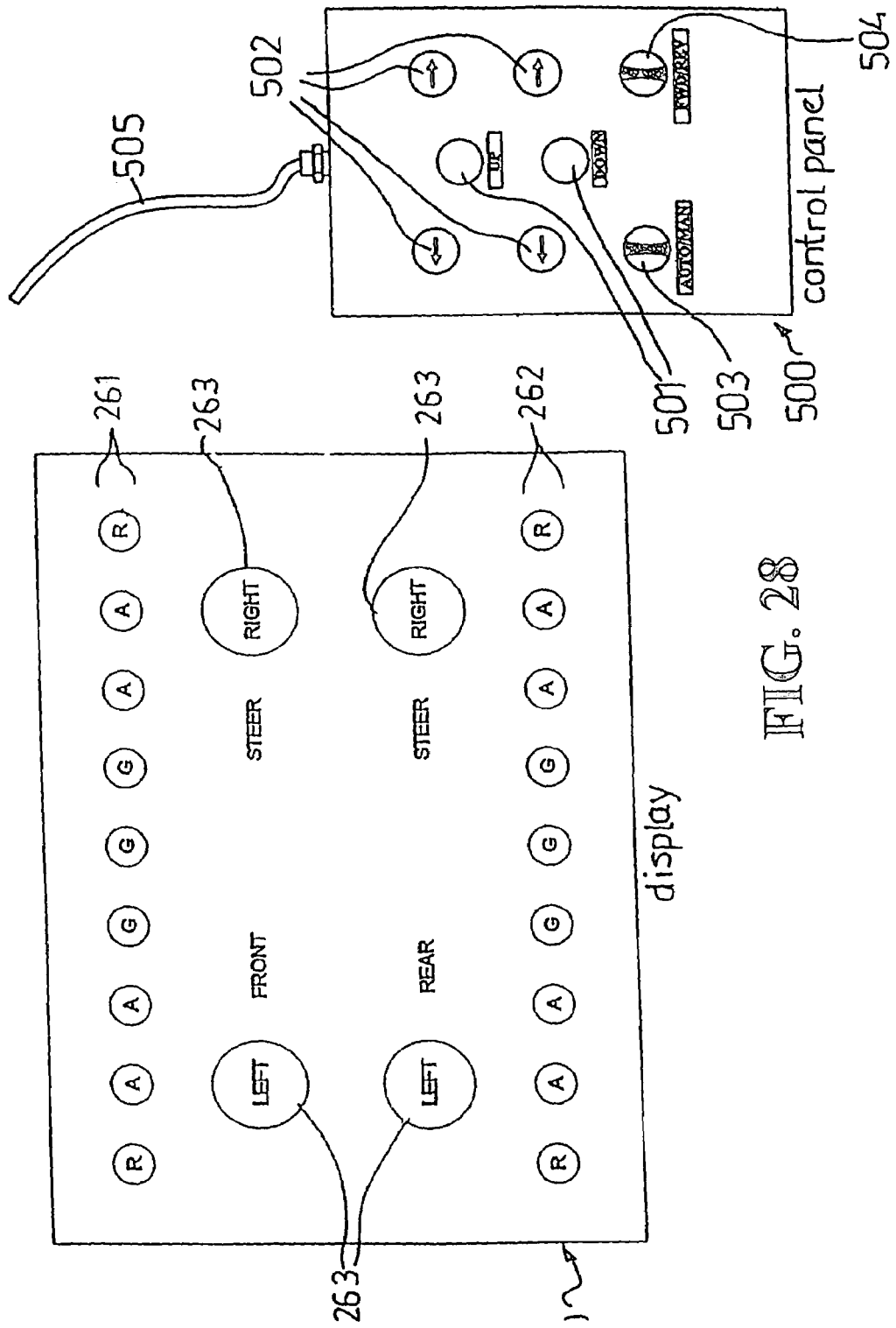
FIG. 28 shows a control panel and display of the trolley of FIG. 1.

As seen in FIG. 28, the electronic control system includes a control panel 500 and a display 260 for informing an operator of the trolley 1 of both the position of the trolley 1 relative to the container sidewall and that the correct direction of steering is being employed. The control panel 500 also enables the operator to steer the trolley 1 manually. This may be of importance when precision steering is not necessary or when there is a systems fault with the automatic steering of the trolley 1.

The display 260 has a top row 261 of coloured lights ("R" for red, "A" for amber, "G" for green) that illuminate to indicate the position of monitor 220 in relation to the container sidewall. The display 260 has a bottom row 262 of coloured lights which illuminate to indicate the position of monitor 221 in relation to the container sidewall. Buttons 263 illuminate to indicate the direction of manual or automatic steering. A red light will illuminate when a monitor 220, 221 is either at the maximum or minimum distance allowable from a sidewall (and a collision with either sidewall is imminent), and a green light will illuminate when a monitor 220, 221 is at an optimal distance from the sidewall. An amber light will illuminate when a monitor 220, 221 is between the optimal distance and the maximum/minimum distance allowable.

The control panel 500 has press buttons 502 that enable the trolley 1 to be steered manually, as well as press buttons 501 that activate the lifting cylinders 140 to either extend or retract the rollers 7, 8, 9, 10, 11, 12, 13. A selector switch 503 is used to select between manual and automatic steering. A selector switch 504 overrides the rotary encoder 201 and is used to select forward or reverse steering.

Referring now to FIGS. 1 to 3, the control tower 16 has an upper compartment 290 for housing the display 260 and lower compartments 291 for housing a battery, a DC motor driven pump unit powered by the battery, hydraulic equipment (as per FIG. 29), computer circuitry of the electronic control system, and the control panel 500. A cable 505 connects the control panel 500 to circuitry within the control tower 16. Hydraulic hoses and electrical cables (not shown) extend from the control tower 16 and within the spacer arms 70, 80 and between the sidewalls 23, 25 and skirt 31, 32 of the load supports 4, 5 to each lifting cylinder 140, steering cylinder 150 and monitor 220, 221.

FIG. 29 is a hydraulic circuit diagram for the trolley 1 showing: a strainer 321; a breather 320; a temperature/low oil sight glass 319; an accumulator dump valve 318; a 200 bar pressure switch 317; a check valve 316; a pressure gauge 315; a flow control 314; a 75 bar pressure switch 313; a 65 bar accumulator 312; steering cylinders 150; lifting cylinders 140; 280 bar counterbalance cartridges 309; a return filter 308; a 175 bar pressure switch 307; a check valve 306; a manifold 305; a reservoir assembly 304; directional controls 303; a 210 bar relief valve 302; and, a 250 bar pump unit 301.

When power is applied to the trolley 1, the pump unit 301 starts under no pressure by directional control 303g freely circulating hydraulic fluid back to the reservoir assembly 304 until directional control 303g is closed by its solenoid. Pressure switches 307, 313 and 317 automatically activate the pump unit 301 to pressurise the accumulator 312 to a preset pressure. When the pressure within the accumulator 312 falls to a predetermined value, then the pump unit 301 is again activated. Hydraulic fluid is stored in the accumulator 312 under pressure in order to eliminate frequent stopping and starting of the pump unit 301 whilst the steering cylinders 150 are in operation.

In order to steer the trolley 1, hydraulic fluid is stored in the accumulator 312 and check valve 316 must be under pressure. Hydraulic fluid is then directed to and drained from select ports 175, 176, 177 of select steering cylinders 150 by way of directional controls 303c, 303d, 303e and 303f using control panel 500, as described earlier. Should fluid pressure fall below the predetermined pressure of pressure switch 313, then the accumulator 312 is re-pressurised as described earlier. The accumulator dump valve 318 must be open for service to release stored fluid pressure.

In order to raise a load, the pump unit 301 starts under no pressure, directional controls 303a and 303g are closed using control panel 500, hydraulic fluid then travels to the lifting cylinders 140 and the rollers 7, 8, 9, 10, 11, 12, 13 extend from the housing 16. The pump unit 301 continues to run until a predetermined pressure is reached (as determined by pressure switch 317), ensuring that the heaviest load is completely raised. In order to lower the load, the pump unit 301 operates until a medium pressure is achieved and directional controls 303g and 303b are opened.

Figure 27:
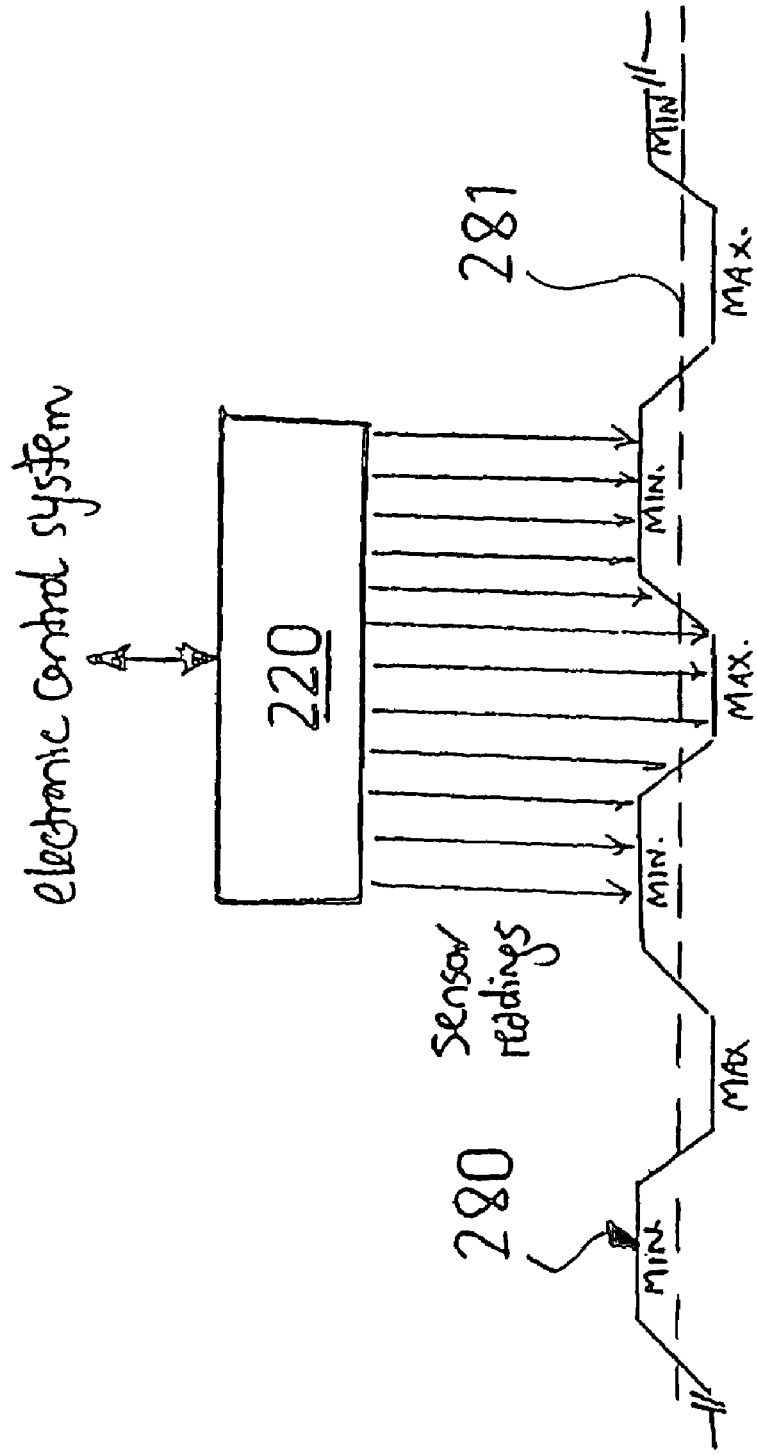
FIG. 27 is a schematic showing how a distance monitor of a steering system of the trolley of FIG. 1 operates.

In use, a shipping container is positioned at an end of a loading platform. The container and loading platform are aligned straight by a suitable positioning system. A reflector guard, having a substantially identical profile as an internal sidewall of the container, is positioned on the loading platform in the plane of the internal sidewall. As depicted in FIG. 27, the electronic control system of the trolley 1 is programmed with the pre-set distance by scanning the reflector guard 280 with the monitor 220 located at the first load support 4. Since most container sidewalls are corrugated, the reflector guard 280 can have a corrugated profile, and the programming of the pre-set distance will take into account the undulating surface. Steering is achieved by periodically taking maximum and minimum sensor distance readings, then taking an average of those readings and steering to a longitudinally extending central plane 281 of the corrugations.

A 2 m single-decked pallet 250 laden with cargo, such as the pallet 250 shown in FIGS. 30, 31 and 32, is next positioned accurately on the loading platform. With the rollers 7, 8, 9, 10, 11, 12, 13 retracted, the forks 2 are driven between the blocks of the pallet 250 such that the monitors 220, 221 align with openings 251 of the pallet 250. The rollers 7, 8, 9, 10, 11, 12, 13 are then extended using the lifting cylinders 140, the load supports 4, 5 bear against the deckboards of the pallet 250 and the cargo is raised up off the ground. The lifting cylinders 140 may exert a 50 tonne force and may be able to lift a load of about 30 tonnes.

The trolley 1 is then driven into the container. If the trolley 1 travels over uneven ground, one or more roller housing 6 will pivot the rollers 7, 8, 9, 10, 11, 12, 13 to maintain contact with the ground and in this way evenly distribute the weight of the cargo. The monitors 220, 221 signal the electronic control system and the electronic control system activates the steering cylinders 150 to steer the roller housings 6 so that each monitor 220, 221 is kept at the pre-set distance from the container sidewall. The position of each monitor 220, 221 relative to the container sidewall is monitored by way of the display 260. Should the monitors 220, 221 have moved too far away from the sidewall, then one or more amber or red lights will appear on the display 260 and the electronic control system will select appropriate directional controls 303 to actuate the steering cylinders 150 and to steer the roller housings 6 towards the container sidewall until the monitors 220, 221 sense that the fork 2 is once again at the pre-set distance. Should a fork 2 have moved too close to the sidewall, then the electronic control system will select appropriate directional controls 303 to actuate the steering cylinders 150 and to steer the roller housings 6 away from the container sidewall until the monitors 220, 221 sense that the fork 2 is once again at the pre-set distance. A red light on the display 260 would indicate to the operator to stop the trolley 1 immediately and to reverse out as a collision with the sidewall is imminent.

With the cargo loaded within the container, the rollers 7, 8, 9, 10, 11, 12, 13 are retracted and the forks 2 are withdrawn from the palletised cargo. The rotary encoder 201 differentiates between forward and reverse directions, and when reversing the trolley 1 out of the container, the roller housings 6 are steered in an opposite direction to that when the trolley 1 is being driven forwards.

The steering system enables a cargo-laden trolley to be accurately and automatically steered within the confines of a cargo container, within about 15 mm of the container sidewalls. The invention is particularly suitable for loads up to about 30 tonnes and 12 m in length. Hence, the present invention overcomes the difficulties with steering a cargo-laden trolley manually within the confines of a shipping container and minimizes the problem of inefficient utilisation of the container.

The pivotable roller housings 6 ensure that the rollers 7, 8, 9, 10, 11, 12, 13 maintain contact with the ground at all times and in this way overcomes the problem of uneven weight distribution of cargo when traveling over uneven ground.

FIGS. 33 to 40 illustrate part of a roller housing 600 and rollers 601, 602, 603, 604, 605, 606 for trolley 1 according to another embodiment of the invention. Each roller housing 600 has a slightly pitched roof 610, a pair of end walls 611, 612 and a pair of sidewalls 613, 614. A pin 616 extends through the sidewalls 613, 614 and into spherical bearings 60, 61 as described earlier such that the roller housing 600 may pivot beneath the top plate 20 of the load support.

Six carbon-steel rollers 601, 602, 603, 604, 605, 606 may be extended from the housing 600 and partly retracted into the housing 600. The rollers 601, 602, 603, 604, 605, 606 extend between opposing sidewalls 701, 702 of a rectangular roller carriage 620.

Two hydraulic rams 630 extend and retract the carriage 620 relative to the housing 600 such that the trolley 1 may be raised and lowered. Rams 630 provide greater clearance between the ground and the housing 600 as compared with lifting cylinder 140 illustrated in FIGS. 10 to 13. A housing of each ram 630 is connected to roof 610 and a piston 632 of each ram 630 is connected to a crosspiece 634 of carriage 620.

Details of the hydraulic rams 630 are shown in FIGS. 37 and 38. Each ram 630 has a body. 660 containing a bore 661, a first piston 662 containing a bore 663, a second piston 664 containing a bore 665, and a third piston 666 (earlier referred to with numeral 632). The pistons 662, 664 and 666 are slidable relative to the body 660 as well as to each other between a fully retracted position (as shown in FIG. 37) and a fully extended position (as shown in FIG. 38). In the fully retracted position, piston 666 is retracted within bore 665, piston 664 is retracted within bore 663, and piston 662 is retracted within bore 661. In the fully extended position, a rim 685 of piston 662 abuts a shoulder 680 of body 660, a rim 686 of piston 664 abuts a shoulder 681 of piston 662, and a rim 683 of piston 666 abuts a shoulder 682 of piston 664.

First 670 and second 671 ports for hydraulic fluid extend to bore 661. When the piston 632 is fully retracted, a third port 672 extends between bore 661 and bore 663, and a fourth port 673 extends between bore 663 and bore 665. In order to fully extend piston 632, hydraulic fluid is delivered to bore 661 via port 670, and each of bores 661, 663 and 665 fills with hydraulic fluid. In order to fully retract piston 632, hydraulic fluid is withdrawn from bores 661, 663 and 665 via port 670, after which hydraulic fluid is introduced to bores 661, 663 and 665 via ports 671, 672 and 673.

Figure 35:
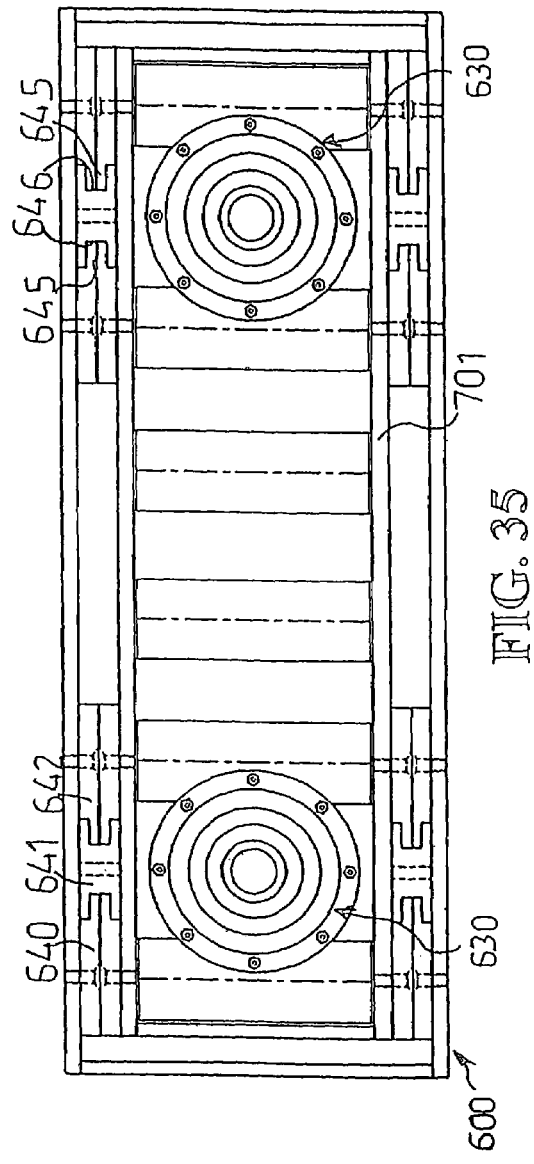
FIG. 35 is the same as FIG. 33 but with the rollers in an extended position.
Figure 36:
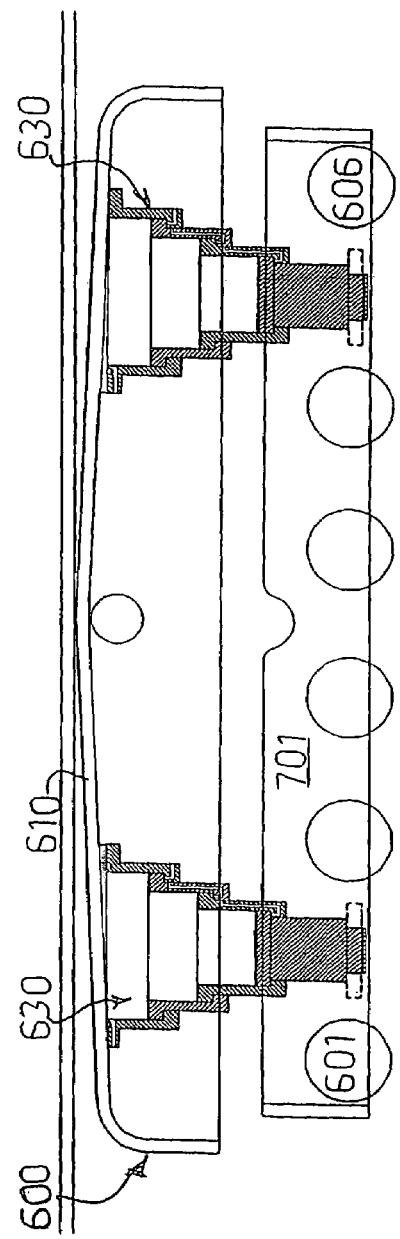
FIG. 36 is a detailed side elevation view of FIG. 35.

Due to the low bearing areas of the rams 630 (ie. their inability to withstand high side loads), four sets of vertically extending guides 640, 641, 642 are used for guiding the carriage 620 between the extended and retracted positions. The guides 640, 641, 642 are shown in part in FIGS. 33 and 35. Vertical guide member 640 is pinned to carriage 620 and vertical guide member 642 is pinned to sidewall 613 or 614. Both guide members 640 and 642 have a tongue 645 extending towards vertical guide member 641. Opposing grooves 646 of guide member 641 receive the tongues 645. Guide members 640, 641 and 642 are of similar length, and guide member 641 is slidable along both guide members 640 and 642 between set points. When carriage 620 is retracted within roller housing 600 as shown in FIGS. 33 and 34, then the grooves 646 are completely engaged by the tongues 645. When carriage 620 is extended from within roller housing 600, as shown in FIGS. 35 and 36, then grooves 646 are only partially engaged by the tongues 645.

FIGS. 39 and 40 show, in part, a load-sharing suspension arrangement for the rollers 601, 602, 603, 604, 605, 606. (The load-sharing suspension arrangement has been omitted from FIGS. 33 to 36). Openings 700 in sidewalls 701 and 702 of the carriage 620 are located adjacent the ends of the rollers 601, 602, 603, 604, 605, 606. A block 710 is slidably mounted within each opening 700 and an end of each roller 601, 602, 603, 604, 605, 606 is pinned thereto.

A hydraulic suspension cylinder 720 is located within each opening 700 above rollers 601, 602, 603, 604, 605 and 606. A piston 721 of cylinder 720 is connected to block 710. Hydraulic lines 722 interconnect all cylinders 720 of the roller housing 600 together in a static condition. When a roller 601, 602, 603, 604, 605, 606 (or rollers) is placed under load, then the respective pistons 721 retract and hydraulic fluid is transferred to cylinders 720 of the other rollers 601, 602, 603, 604, 605, 606 via lines 722 until the pressure is transferred evenly between the rollers 601, 602, 603, 604, 605, 606. Each piston 721 has a maximum stroke of 10 mm. The load-sharing suspension arrangement improves load sharing on all rollers 601, 602, 603, 604, 605, 606 and together with the rocking motion of the roller housing 600 enables the trolley 1 to negotiated greater variations in loading ramp and container floor angles and ground irregularities.

Figure 41:
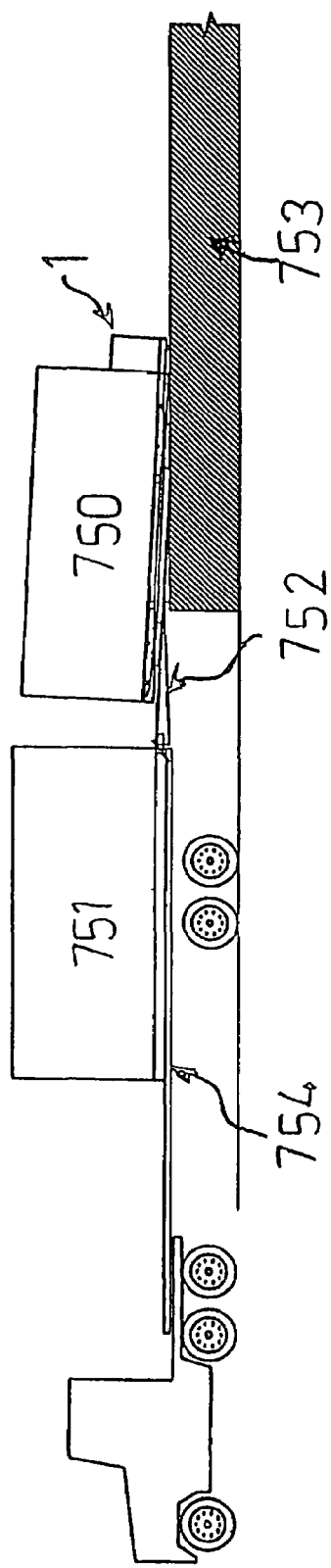
FIG. 41 depicts the trolley of FIG. 33 being driven into a shipping container.

FIG. 41 depicts how the trolley 1 carrying a load 750 may be driven into a shipping container 751. A ramp 752 extends between a loading platform 753 and truck 754 carrying the container 751. The ramp 752 may be, for instance, a drawbridge or telescopically extendable, it may be hydraulically driven. An end of the ramp 752 has twist lock arrangements 755 for connecting to openings of the container 751. The twist lock arrangements 755 enable the ramp 752 to adjust its angle of inclination as the height of the container 751 changes under the weight of the trolley 1. The particular ramp 752 shown in FIG. 41 is telescopic and also adjusts in length as the ramp's 752 angle of inclination adjusts under the weight of the trolley 1.

Whilst the above has been given by way of illustrative example of the invention, many modifications and variations may be made thereto by persons skilled in the art without departing from the broad scope and ambit of the invention as herein set forth.

The invention claimed is:

1. A transport trolley having:
   at least two interconnected spaced tines that extend parallel with a longitudinal axis of the trolley, wherein each said tine has a forward region, a central region and a rearward region;
   a roller housing mounted to each of said forward region and a roller and a roller housing mounted to each said central region or rearward region, wherein said roller housing contain ground-engaging rollers and each said roller housing has a mounting pin for mounting to a said tine; and
   steering system including:
      distance monitors connected to the forward region and to the central or rearward regions of at least one of the tines for monitoring the distance between the at least one tine (hereafter referred to as the "monitoring tine") and at least one sidewall of a container, wherein in use the at least one sidewall extends generally parallel with the longitudinal axis of the trolley;
      a drive system which includes hydraulic steering cylinders for moving the rollers relative to the tines as well as for moving the rollers at the forward regions independently of the rollers at the central or rearward regions, wherein pistons of said hydraulic steering cylinders extend parallel with the longitudinal axis of the trolley and are movable between an intermediate position whereby the rollers are in alignment with the longitudinal axis of the trolley and the trolley is steered straight, and an extend position and a retracted position relative to the intermediate position whereby the rollers are out of alignment with the longitudinal axis and the trolley is steerable in directions other than straight; and
      an electronic control system, operatively connected to the distance monitors and the drive system, for activating the drive system such that the monitoring tine may be maintained at a pre-set distance from the at least one sidewall.

2. The transport trolley of claim 1, wherein the pre-set distance is programmed by scanning a reflector guard of suitable profile with the distance monitor at the forward region of the monitoring tine, wherein the reflector guard is positioned outside the container and within a plane of the at least one sidewall.

3. The transport trolley of claim 2, wherein the reflector guard has a substantially identical profile to that of the at least one sidewall.

4. The transport trolley of claim 3, wherein the reflector guard is corrugated and the corrugated profile is taken into account when programming the pre-set distance for the distance monitor.

5. The transport trolley of claim 4, wherein steering is achieved by periodically taking maximum and minimum distance readings, than taking an average of those readings and steering to a longitudinally extending central plane of the corrugations.

6. The transport trolley of claim 1 further having an incremental rotary encoder operatively connected to the electronic control system for coordination therewith.

7. The transport trolley of claim 6, wherein the encoder is connected to a ground-contacting wheel of the trolley.

8. The transport trolley of claim 6, wherein data from the encoder is displayed on a display of the electronic control system.

9. The transport trolley of claim 7, wherein said ground-contacting wheel is pivotable out of contact with the ground.

10. The transport trolley of claim 1, wherein a piston of a said steering cylinder is connected to a first end of a said mounting pin and moves the first end relative to a second end of the mounting pin.

11. The transport trolley of claim 10, wherein both the first and second ends of the mounting pin are located within spherical bearings of the tine and both said spherical bearings are slidably mounted to the tine.

12. The transport trolley of claim 1, wherein the electronic control system includes a control panel and display whereby an operator of the trolley is informed of both the position of the monitoring tine relative to the at least one sidewall and that the correct direction of steering is being employed.

13. The transport trolley of claim 12, wherein the control panel and display enable the operator to steer the trolley manually.

14. The transport trolley of claim 1, wherein the roller housings are connected to load supports of the tines.

15. The transport trolley of claim 1, wherein each said distance monitor is a photoelectric sensor.

16. The transport trolley of claim 1, wherein the electronic control system automatically activates the drive system to correct the direction of travel of the trolley when the monitoring tine has moved from the pre-set distance from the at least one sidewall.

17. The transport trolley of claim 1, wherein the electronic control system is programmable so that the pre-set distance can be adjusted.

18. The transport trolley of claim 1, wherein the distance monitors are connected to load supports of the monitoring tine.

19. The transport trolley of claim 1, wherein the pre-set distance is a distance range defined by a maximum allowable distance and a minimum allowable distance from the at least one sidewall.

* * * * *